United States Patent [19]
Derks et al.

[11] Patent Number: 6,021,119
[45] Date of Patent: Feb. 1, 2000

[54] MULTIPLE SITE INTERACTIVE RESPONSE SYSTEM

[75] Inventors: Harry G. Derks; Nicholas W. Medendrop; Michael J. Mc Kanna; Hugh D. Harper, all of Holland; William S. Buehler, Zelland; Patrick L. Moody, Holland; Thomas H. Morell, Grand Haven, all of Mich.

[73] Assignee: Fleetwood Group, Inc., Holland, Mich.

[21] Appl. No.: 08/735,649

[22] Filed: Oct. 24, 1996

Related U.S. Application Data

[63] Continuation-in-part of application No. 08/265,843, Jun. 24, 1994, Pat. No. 5,724,357.

[51] Int. Cl.$^7$ ............................................... H04Q 11/04
[52] U.S. Cl. ............................ 370/261; 370/276; 370/413; 348/13; 434/350
[58] Field of Search .................... 370/260, 261, 370/270, 310, 413, 463; 348/12, 13; 434/350, 351

[56] References Cited

U.S. PATENT DOCUMENTS

| | | | |
|---|---|---|---|
| Re. 35,449 | 2/1997 | Derks ................................ | 395/800 |
| 2,352,634 | 7/1944 | Hull .................................... | 250/9 |
| 3,245,157 | 4/1966 | Laviana ............................. | 35/9 |
| 3,314,172 | 4/1967 | Boyett ............................... | 35/48 |
| 3,401,469 | 9/1968 | Shaver et al. ..................... | 35/8 |
| 3,416,243 | 12/1968 | Greenberg et al. .............. | 35/48 |
| 3,445,815 | 5/1969 | Saltzberg et al. ................ | 340/163 |
| 3,454,718 | 7/1969 | Perrault ............................. | 178/66 |
| 3,491,464 | 1/1970 | Gray .................................... | 35/48 |
| 3,500,559 | 3/1970 | Jones et al. ........................ | 340/172.5 |
| 3,546,791 | 12/1970 | Koos et al. ........................ | 35/9 |
| 3,623,242 | 11/1971 | Hoover ............................... | 35/35 C |
| 3,631,612 | 1/1972 | Westerberg ....................... | 35/48 R |
| 3,676,580 | 7/1972 | Beck ................................... | 178/5.1 |
| 3,676,939 | 7/1972 | Oberst et al. ..................... | 35/48 R |
| 3,715,510 | 2/1973 | Birnbaum et al. ............... | 179/15 BM |
| 3,737,858 | 6/1973 | Turner et al. ..................... | 340/151 |

(List continued on next page.)

FOREIGN PATENT DOCUMENTS

| | | | |
|---|---|---|---|
| 2108935 | 4/1994 | Canada ............................. | H04M 1/00 |
| 0556853 A2 | 8/1993 | European Pat. Off. .......... | G07C 13/00 |
| 0619663 A2 | 10/1994 | European Pat. Off. .......... | H04L 12/28 |
| 4321801 C1 | 7/1994 | Germany ........................... | G07C 13/00 |
| 1078296 | 8/1967 | United Kingdom .............. | H04B 7/04 |
| 1523753 | 9/1978 | United Kingdom .............. | H04Q 9/00 |

OTHER PUBLICATIONS

Search Report from corresponding European Application No. EP 95 30 4487.

*Primary Examiner*—Douglas W. Olms
*Assistant Examiner*—Shick Hom
*Attorney, Agent, or Firm*—Van Dyke, Gardner, Linn & Burkhart, LLP

[57] ABSTRACT

An interactive response system includes a central control host system and one or more wireless remote systems geographically separated from the host system and interconnected with the host system through a communication network. Each remote system includes a base unit and a plurality of response units coupled with the base units through a wireless communication link. Each of the response units includes a microphone, a user input device and a control. Audio signals entered through the microphone are communicated over the wireless communication channel to the base unit and over the communication network to the host system. Any inputs entered on the input device are communicated over the wireless communication channel to the base unit. The host system includes an instructor selection device and a display. At least one call list is displayed on the display. The instructor may select characteristics of individuals for inclusion on the call list. Individuals requesting to have an audio link with the instructor are placed on the call list if a characteristic of theirs from a database roster matches the characteristic set up by the instructor for that call list.

60 Claims, 17 Drawing Sheets

U.S. PATENT DOCUMENTS

| | | | |
|---|---|---|---|
| 3,757,035 | 9/1973 | Sullivan | 178/6 |
| 3,769,579 | 10/1973 | Harney | 325/31 |
| 3,789,136 | 1/1974 | Haith et al. | 178/5.8 R |
| 3,803,491 | 4/1974 | Osborn | 325/53 |
| 3,810,316 | 5/1974 | Lahlou | 35/8 |
| 4,048,729 | 9/1977 | Derks | 35/8 A |
| 4,052,798 | 10/1977 | Tomita et al. | 35/9 |
| 4,057,805 | 11/1977 | Dowling | 343/225 |
| 4,076,964 | 2/1978 | Henrion et al. | 179/15 BS |
| 4,107,608 | 8/1978 | Saburi | 325/4 |
| 4,107,734 | 8/1978 | Percy et al. | 358/84 |
| 4,205,464 | 6/1980 | Baggott | 35/22 R |
| 4,238,893 | 12/1980 | Komatsubara et al. | 434/351 |
| 4,290,141 | 9/1981 | Anderson et al. | 455/2 |
| 4,334,319 | 6/1982 | Gurry | 455/227 |
| 4,347,604 | 8/1982 | Saito et al. | 370/85 |
| 4,354,252 | 10/1982 | Lamb et al. | 364/900 |
| 4,365,249 | 12/1982 | Tabata | 340/825.3 |
| 4,365,267 | 12/1982 | Tsuda | 358/84 |
| 4,367,485 | 1/1983 | Hemmie | 358/86 |
| 4,377,870 | 3/1983 | Anderson et al. | 455/2 |
| 4,385,314 | 5/1983 | Yashiro | 358/84 |
| 4,392,132 | 7/1983 | Derks | 340/825.14 |
| 4,415,065 | 11/1983 | Sandstedt | 186/39 |
| 4,475,121 | 10/1984 | Yashiro | 358/84 |
| 4,477,809 | 10/1984 | Bose | 340/825.54 |
| 4,493,655 | 1/1985 | Groff | 434/351 |
| 4,574,284 | 3/1986 | Feldman et al. | 370/463 |
| 4,584,602 | 4/1986 | Nakagawa | 358/84 |
| 4,591,906 | 5/1986 | Morales-Garza et al. | 358/84 |
| 4,639,914 | 1/1987 | Winters | 370/110.1 |
| 4,654,818 | 3/1987 | Wetterau, Jr. | 364/900 |
| 4,663,499 | 5/1987 | Duval | 178/2 R |
| 4,663,744 | 5/1987 | Russell et al. | 367/76 |
| 4,667,193 | 5/1987 | Cotie et al. | 340/825.08 |
| 4,682,958 | 7/1987 | Slavik et al. | 434/335 |
| 4,689,619 | 8/1987 | O'Brien, Jr. | 340/825.08 |
| 4,691,202 | 9/1987 | Denne et al. | 340/825.54 |
| 4,789,983 | 12/1988 | Acampora et al. | 370/96 |
| 4,817,115 | 3/1989 | Campo et al. | 375/22 |
| 4,820,167 | 4/1989 | Nobles et al. | 434/336 |
| 4,877,408 | 10/1989 | Hartsfield | 434/350 |
| 4,910,794 | 3/1990 | Mahany | 455/67 |
| 4,918,437 | 4/1990 | Jasinski et al. | 340/825.44 |
| 4,921,464 | 5/1990 | Ito et al. | 455/34 |
| 4,926,375 | 5/1990 | Mercer et al. | 364/900 |
| 4,928,099 | 5/1990 | Drake | 340/825.28 |
| 4,937,586 | 6/1990 | Stevens et al. | 343/702 |
| 5,001,755 | 3/1991 | Skret | 380/46 |
| 5,068,787 | 11/1991 | Pipella et al. | 364/406 |
| 5,093,786 | 3/1992 | Derks | 395/800 |
| 5,226,177 | 7/1993 | Nickerson | 455/2 |
| 5,273,437 | 12/1993 | Caldwell et al. | 434/351 |
| 5,297,144 | 3/1994 | Gilbert et al. | 370/95.2 |
| 5,303,042 | 4/1994 | Lewis et al. | 348/14 |
| 5,329,620 | 7/1994 | Alford et al. | 395/200 |
| 5,357,609 | 10/1994 | Sellers et al. | 395/200 |
| 5,371,858 | 12/1994 | Miller et al. | 395/275 |
| 5,379,213 | 1/1995 | Derks | 364/411 |
| 5,629,868 | 5/1997 | Tessier et al. | 364/514 R |
| 5,694,334 | 12/1997 | Donahue et al. | 364/514 R |
| 5,727,950 | 3/1998 | Cook et al. | 434/350 |

MULTIPLE SITE INTERACTIVE RESPONSE SYSTEM

This application is a continuation-in-part of application Ser. No. 08/265,843 filed on Jun. 24, 1994 by Harry G. Derks now U.S. Pat. No. 5,724,357.

BACKGROUND OF THE INVENTION

This invention relates to a response system which obtains the individual response of audience members to questions put to them and, in particular, to an interactive response system for retrieving at a central location responses from a plurality of users located at at least one geographically separated site and providing interaction between an instructor at the central location and the users. The invention finds application as an educational aid for determining the comprehension levels of pupils in a class and as a commercial tool for conducting audience preference polls and the like.

Interactive response systems which retrieve at a central location responses from a plurality of users located at geographically separated sites and which provide further action between an instructor at the central location and the users have long been known. Such systems are also referred to as distance-learning systems. In one such system, each remote site includes a plurality of keypads on a daisy chain cable. Each of the keypads includes a microphone. A student wishing to speak to the instructor at the remote site presses a button on the keypad. A host computer at the host site displays a queue of call/request messages including the identity and total number of callers. Certain individuals are provided a priority status which is displayed when those individuals request a call. When the instructor wishes to accept a call from a particular individual, the host computer sends an enabling signal which connects the microphone of the corresponding keypad unit back to the instructor via a voice communication channel.

Such hard-wired distance-learning systems are exceptionally cumbersome to use because the routing of cables between a base unit at each remote site and the plurality of response units makes all but permanent installations difficult to establish. Furthermore, the providing of priority status to particular individuals, which status is communicated to the instructor when the individual requests a call, is not of much assistance to the instructor. While the instructor may wish to call upon individuals having priority status under certain circumstances, the circumstances may change dependent upon the nature of the question and the like. Such rigid designation of priority status does not provide the instructor with the opportunity to take calls from individuals having characteristics which the instructor knows to be of particular relevance to a particular question or topic.

In U.S. Pat. No. 5,093,786 entitled REMOTE RESPONSE SYSTEM, Harry G. Derks, one of the present inventors, discloses a wireless response system which provides the ability to rapidly and reliably retrieve a response from a plurality of response units at a base unit utilizing a wireless communication link. The Derks system eliminated the difficulties associated with cabling between each of the response units and the base unit and allowed a truly portable system which could be fit within a suitcase, or the like, and be set up in any location, including hotel rooms, classrooms, conference rooms, and the like. Because the Derks system was contemplated primarily for use at a single location at a time, interaction between the instructor and each of the users was on the basis of face-to-face discussion.

SUMMARY OF THE INVENTION

The present invention provides a unique interactive response system which is a significant improvement upon prior distance-learning systems by providing a wireless system which facilitates retrieval at a central location of responses from users located at geographically separated sites while providing many tools for enhancing the interaction between the instructor at the central location and the users.

An interactive response system according to an aspect of the invention includes a central control host system and at least one wireless remote system geographically separated from the host system and interconnected with the host system through a communication network. The remote system includes a base unit and a plurality of response units coupled with the base units through at least one wireless communication link. Each of the response units includes a microphone, a user input device and a control. The control is responsive to a talk command from the base unit to communicate audio signals entered through the microphone over the wireless communication channel. The control communicates any inputs entered on the input device over the communication channel to the base unit. This may include a talk request for an audio connection with the host system. The base unit selectively interconnects with the host system microphones on response units by selectively issuing talk commands. This aspect of the invention, for the first time, allows a truly flexible distance-learning system by avoiding the difficulties associated with hard-wired remote sites.

According to a more particular aspect of the invention, each response unit includes a microphone and an audio transmitter which is responsive to a talk command from the base unit to transmit audio signals received in the microphone to an audio receiver. Each response unit further includes a first wireless data transmitter to transmit a call request and a first data receiver. The base unit includes an audio receiver for receiving an audio signal from one of the response units. The base unit additionally includes a second data receiver to receive call requests from response units and a second data transmitter for transmitting a talk command to a selectable response unit. An interactive response system according to this aspect of the invention uniquely provides for rapid and reliable retrieval of response data from the response units as well as providing reliable control of audio communications between users and an instructor at the host system.

An interactive response system according to yet another aspect of the invention includes a central control host system and at least one remote system geographically separated from the host system and interconnected with the host system through a communication network. The remote system includes a base unit and a plurality of response units coupled with the base unit through a communication link. Each response unit includes a microphone and a user input device wherein a user enters a call request for an audio connection with the host system using the user input device. The base unit establishes an audio connection between the microphone of one of the response units and the host system in response to a talk instruction from the host system. The host system includes a computer, an instructor selection device and a display. The computer defines a roster database of individuals including at least one characteristic of each individual.

The computer generates at least one call list shown on the display. The computer receives a selection of characteristics of individuals entered by the instructor selection device for inclusion on the call list. The computer retrieves individuals from the roster database who have entered a call request and also match the characteristic entered by the instructor. The selected individuals are displayed on the call list. This aspect of the invention provides a flexible tool which allows the operator to sort callers according to characteristics which the instructor defines. By allowing the instructor to establish the criteria for each call list, the instructor can set up call lists based upon characteristics which the instructor deems to be relevant to a particular subject matter and may select from among multiple call lists based upon the nature of a particular topic being discussed.

According to yet an additional aspect of the invention, an indicator on the display indicates the status of each call list. The status indicator may be a colored indication, which displays a green color when only a few individuals are listed on a call list, a yellow color when more individuals are listed on the call list and a red color when many individuals are listed on a call list. This provides useful information to the instructor in managing the call lists without burdening the instructor with monitoring detailed information regarding individuals requesting an audio connection with the instructor.

According to yet an additional aspect of the invention, the host system includes a computer, an instructor selection device and a display. The computer generates a list on the display of individuals who have entered call requests. The selection device provides the capability for the selection of at least one individual on the call list. The host system provides a talk instruction to the base unit of the response unit associated with the selected individual, or individuals, in order to establish an audio connection between the selected individual(s) and the host system. An echo suppression system is provided which suppresses an audio signal from a host system when an audio signal from the selected individual is present. The echo suppression system also suppresses an audio signal from the response unit of the selected individual when an audio signal from the host system is present. The echo suppression system further includes a manual override for the instructor to suppress an audio signal from the response unit of the selected individual. This manual override provides a tool to the instructor which allows the instructor to override a user who speaks in an uninterrupted fashion and thereby utilizes the automatic aspects of the echo suppression system to maintain control of the conversation. The manual override allows the instructor to gain control of the audio channel without the necessity for dropping the call from the system.

These and other objects, advantages and features of this invention will become apparent upon review of the following specification in conjunction with the drawings.

DESCRIPTION OF THE PREFERRED EMBODIMENT

Figure 1:
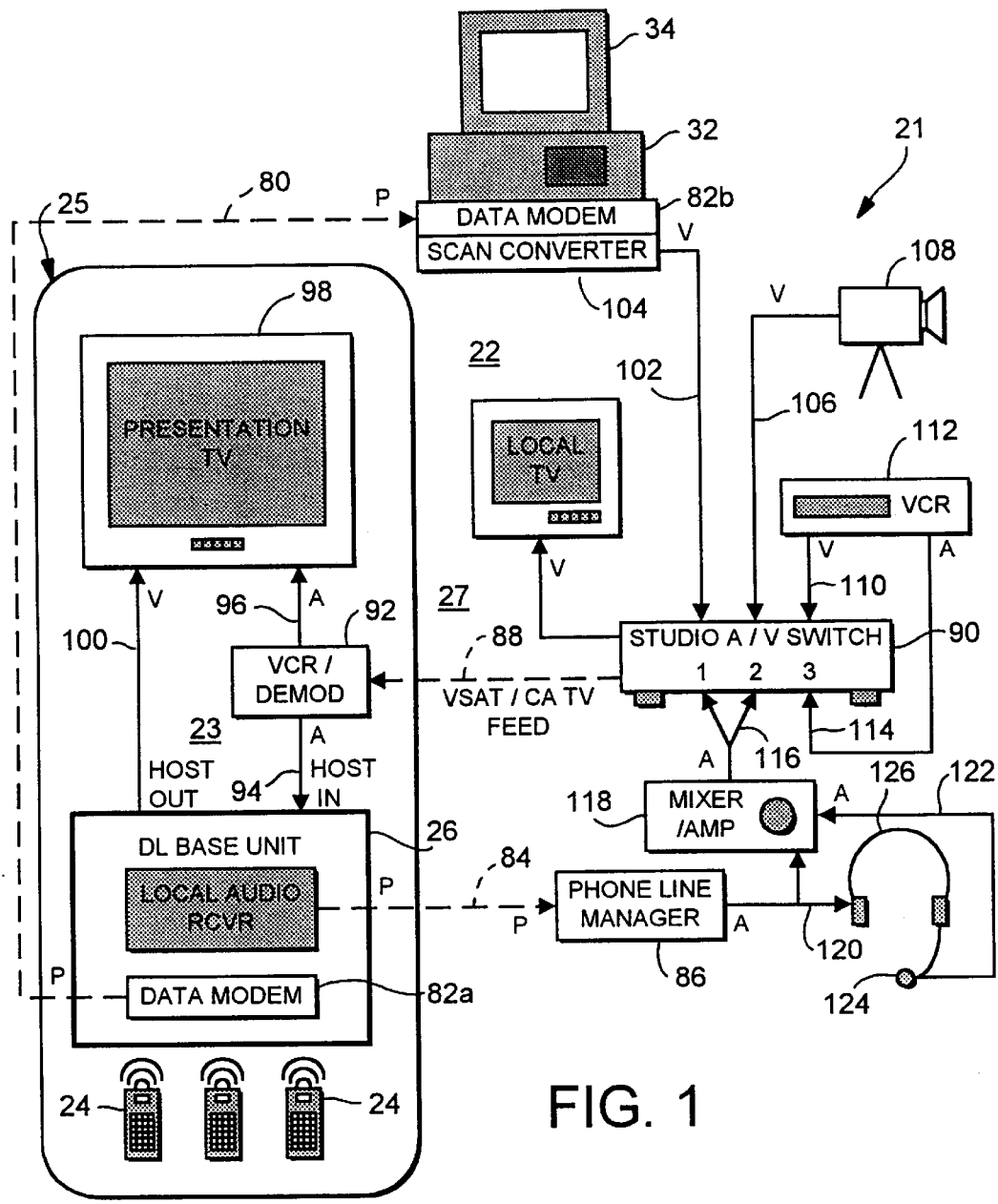
FIG. 1 is a block diagram of an interactive response system for retrieving at a central location responses from a plurality of users located at at least one geographically separated site and providing interaction between an instructor at the central location and the users according to the invention.

Referring now specifically to the drawings, and the illustrative embodiments depicted therein, an interactive response system 20 retrieves at a central location 21 responses from a plurality of users (not shown) located at at least one geographically separated site 25. Interactive response system 20 also provides interaction between an instructor (not shown) at central location 21 and the users, includes a central host control system 22 and at least one wireless remote system 23 (FIG. 1). The central control host system 22 includes a computer 32 including a display 34 and an instructor selection device, such as a locating device, or "mouse," a touch screen, or the like. Remote system 23 includes a base unit 26 and a plurality of response units 24, each of which is provided to a user at the corresponding remote site. Host system 22 is interconnected with each remote system 23 by a communication network generally indicated at 27. Communication network 27 includes a data link 80 for providing a two-way exchange of data between a base unit 26 and host computer 32. In the illustrated embodiment, data link 80 is established between a data modem 82a in base unit 26 and data modem 82b in host computer 32. Communication network 27 additionally includes an audio link 84 in order to provide audio communication between base unit 26 and a phone line manager 86, the latter located at central location 21. In most applications, audio link 84 provides a one-way audio communication from base unit 26 to host system 22. Data link 80 and audio link 84, as will be set forth in more detail below, may be separate connections or can be combined in a unitary link and may be provided utilizing various connectivity techniques. Suffice it to say that both data link 80 and audio link 84 may be provided by a conventional Plain Old Telephone Service (POTS) interconnection. Communication network 27 also includes an audio, or a combined audio/video, feed 88 from central location 21 to a demodulator 92 provided at each geographically separated site 25. Demodulator 92 demodulates the audio, or combined audio/video, feed received from link 88, provides an audio input 94 to base unit 26 and, if present, a video input 96 to a video monitor 98. Base unit 26 processes the audio signal received on input 94 for echo suppression and provides an audio input 100 to monitor 98. Monitor 98 is viewable by the users at geographically separated site 25, each of which is provided with a response unit 24.

Host system 22 may be configured in many different ways to produce audio/video signals for feed over audio/video link 88, as will be discussed in more detail below. This may include an audio/video switch 90 which provides an output on audio/video link 88 and which is provided with a first video input 102 received from a scan converter 104. Scan converter 104 converts images developed by computer 32 and displayed on display 34 to a composite video signal or other suitable video format. Audio/video switch 90 may additionally receive a video input 106 from an auxiliary device, such as a videocamera 108, in order to, for example, capture video images of the instructor or material being handwritten by the instructor on an easel or the like. Audio/video switch 90 may additionally receive a video input 110 from a videocassette recorder 112 in order to provide feed of prerecorded instructional information and the like. Videocassette recorder 112 additionally produces an audio input 114 to audio visual switch 90. An audio input 116 is supplied by an audio mixer and amplifier 118 which combines an audio signal 120 produced by a phone line manager 86 and an audio signal 122 produced from a microphone 124 included in an instructor headset 126. In this manner, audio/video switch 90, which is under the control of the instructor, is capable of supplying to audio/video link 88 audio and video signals produced from various sources.

Figure 13:
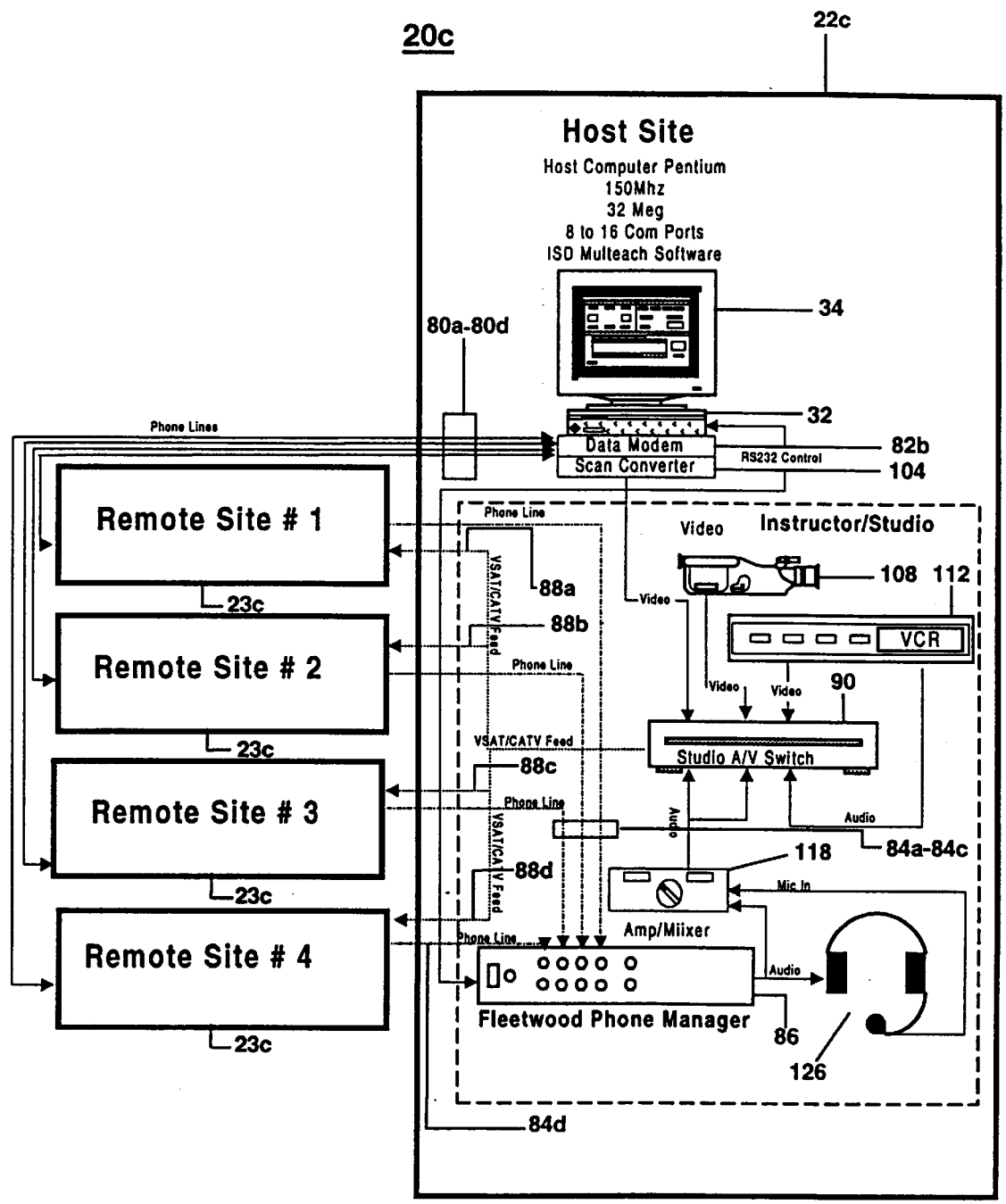
FIG. 13 is the same view as FIG. 11 of a second alternative embodiment.

In the illustrated embodiment, audio/video switch 90 is commercially available and marketed by JVC under Model No. JX-5300. Mixer/amplifier 118 is commercially available and marketed by Radio Shack under Model No. MPA-31. Phone line manager 86 is also commercially available and marketed by Fleetwood Group, Inc. under Model No. 10030. Such phone manager has the capability of processing multiple lines in order to queue calls from multiple sites, as illustrated in FIG. 13. Preferably, the phone manager provides automatic line level compensation such as by using DTMF levels received from the remote sites as reference signals to adjust for line difference. Also, the phone manager preferably includes call verification using a DTMF sequence from each base unit to verify authenticity of each call. Computer 32 is an IBM-compatible PC having a type 486 DX2 or greater microprocessor and preferably a 150 megahertz Pentium® processor, marketed by Intel Corporation. Host computer 32 preferably additionally includes at least 32 megabytes of random access memory, 50 megabytes of free disk space and runs Windows NT Operating System, Version 4.0 or greater, marketed by Microsoft Corporation. Scan converter 104 is preferably a commercially available VGA to NTSC scan converter marketed by Willow Peripherals under Model No. PV 1014-001. The remaining components of host system 22 are common commercially available components which are available from numerous sources.

Figure 2:
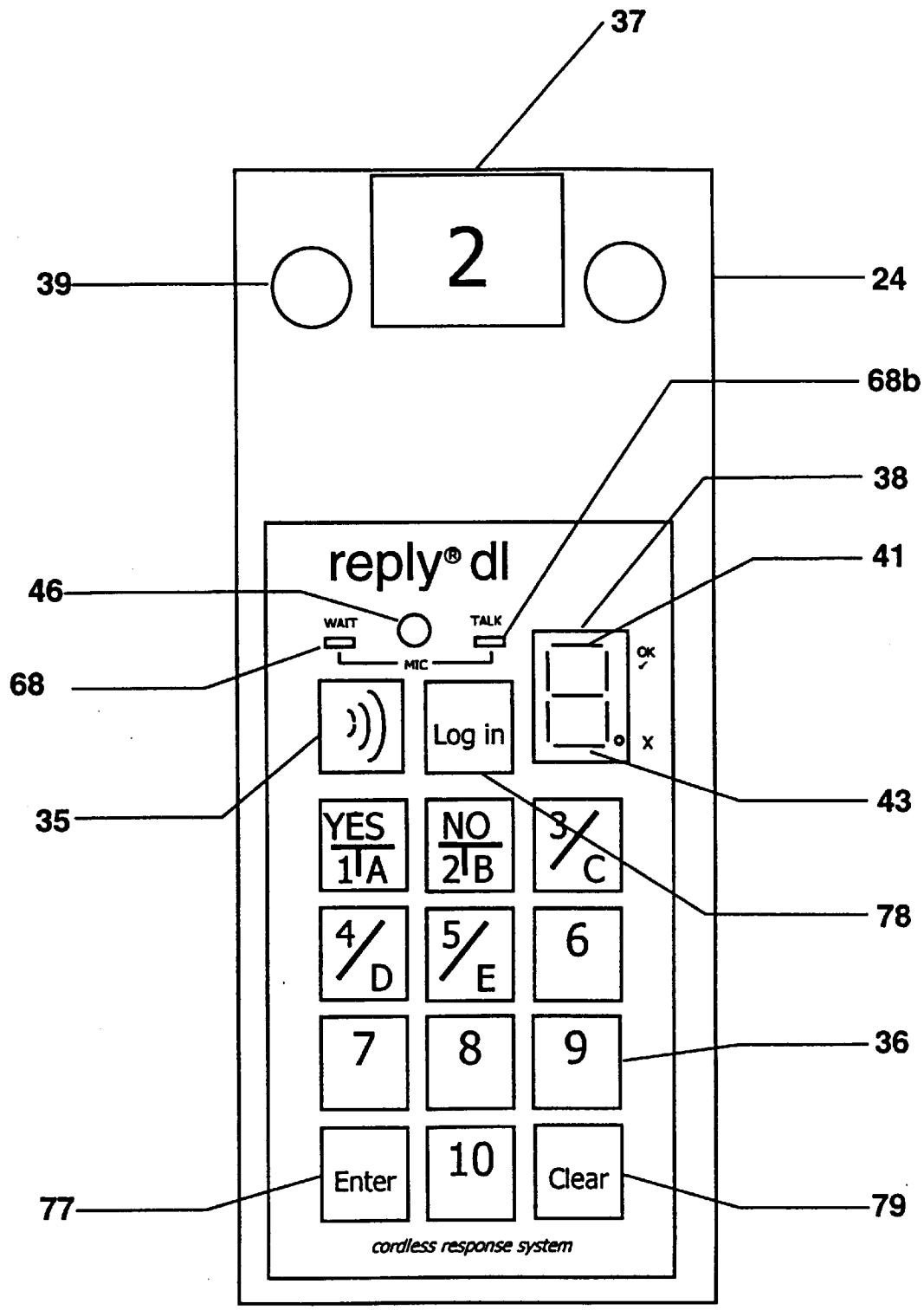
FIG. 2 is a top plan view of a response unit according to the invention.
Figure 3:
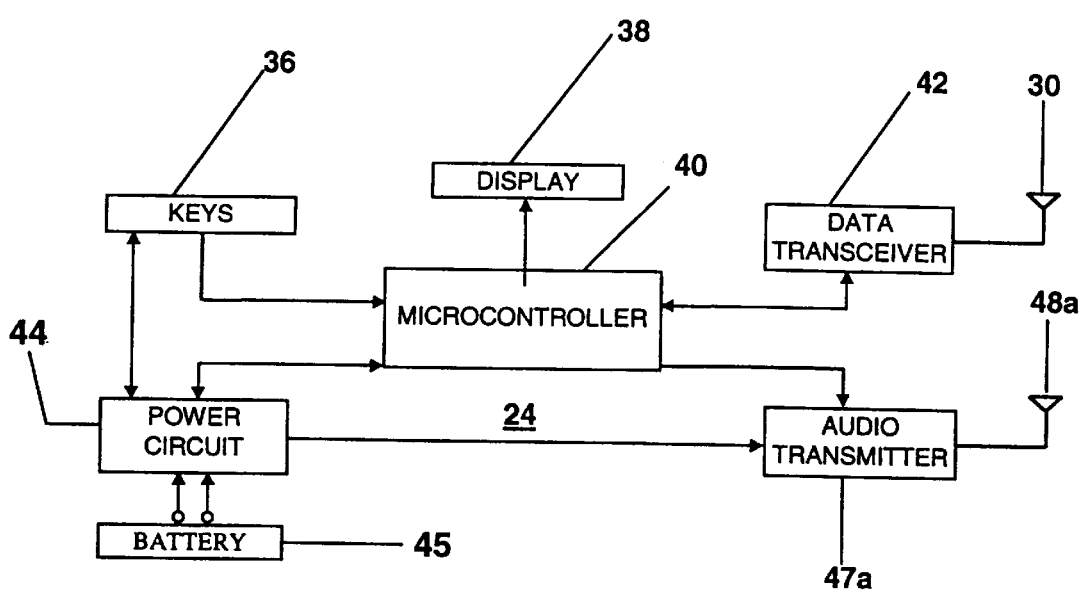
FIG. 3 is a block diagram of the electrical system of a response unit.
Figure 4:
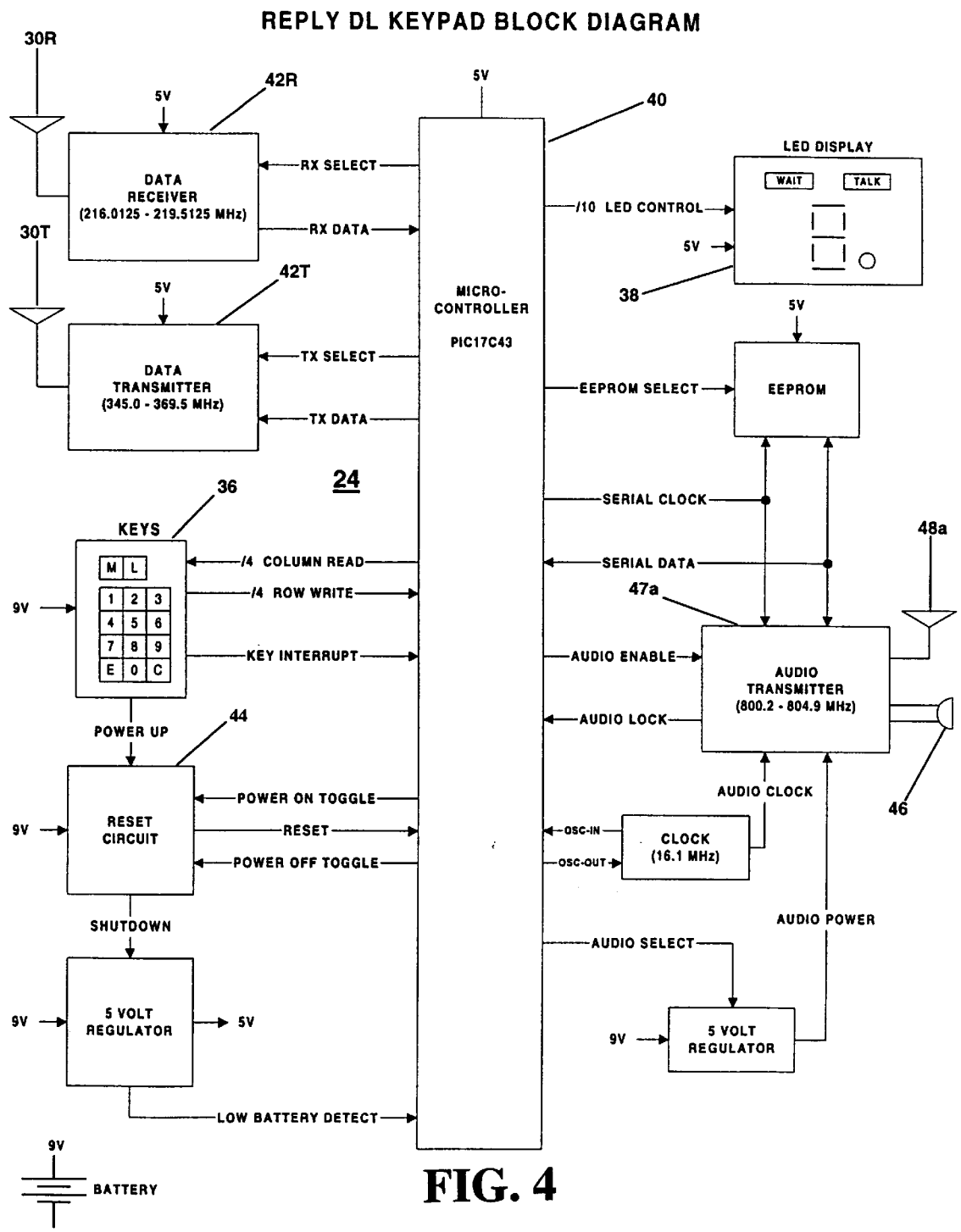
FIG. 4 is the same view as FIG. 3 illustrating more detail thereof.
Figure 5:
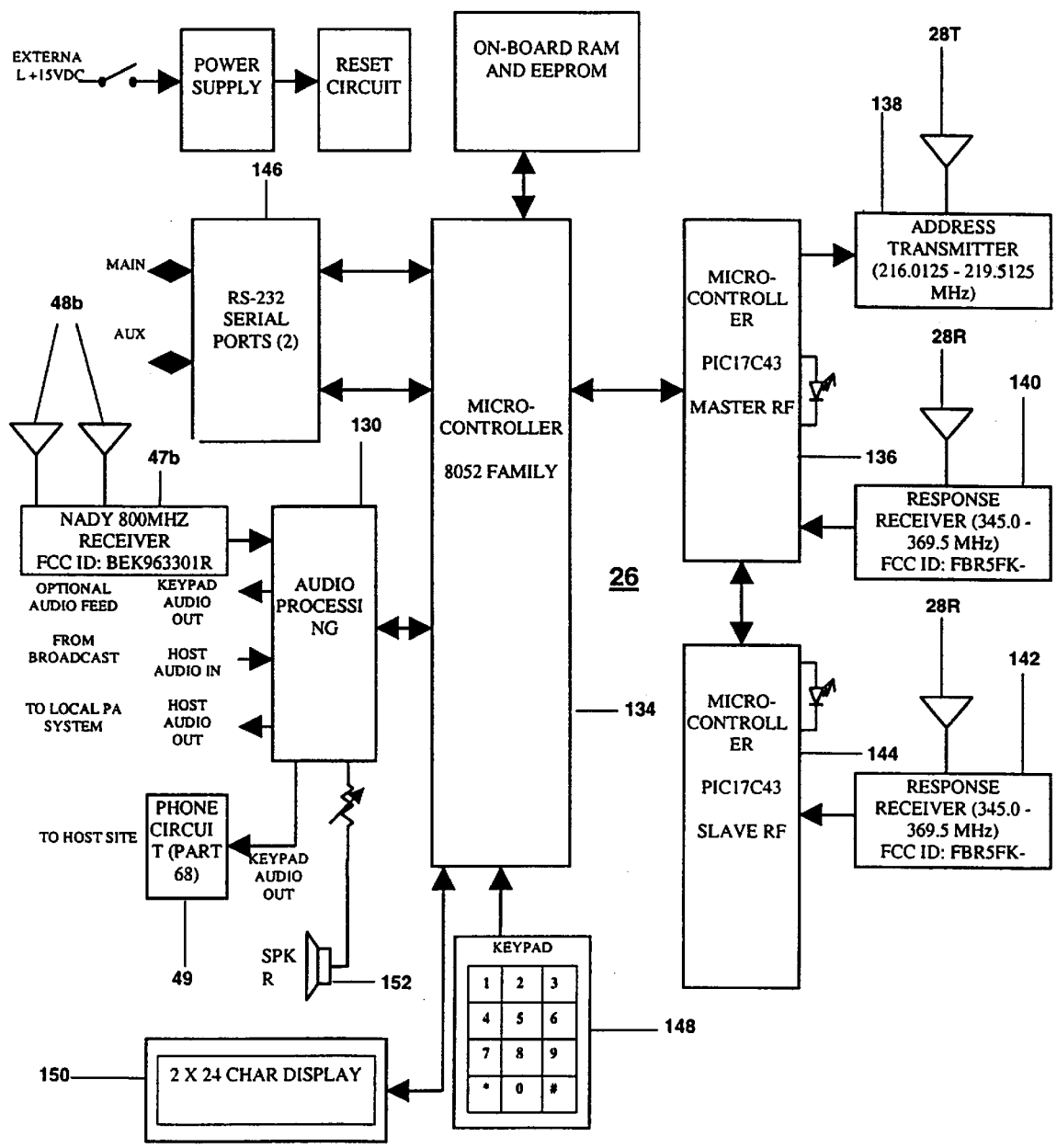
FIG. 5 is a block diagram of an electrical system of a base unit according to the invention.

Each response unit 24 includes an input device, such as a keypad 36, in order to receive user responses and a display device 38 in order to display responses entered on keypad 36 as well as information transmitted from base unit 26 in a manner set forth below (FIGS. 2–4). Keypad 36 includes a call-request key 36, which, when actuated by the user, requests an audio connection with host system 22, a log-in key 78, which, when actuated, places the response unit 24 in a mode to receive a fixed number of digit entries corresponding to a student identification number, or the like, an enter key 77, which is actuated by the user when transmitting multiple digit responses, and a clear key 79, which clears any digits entered by the user provided the entered responses have not been transmitted to the base unit in a manner which will be set forth below. Response unit 24 additionally includes a microphone 46, which picks up the user's voice up to a distance of approximately 30 inches at normal voice amplitude. In the illustrated embodiment, microphone 46 is an electret condenser type. A WAIT indicator 68a is illuminated by the base unit 26, typically under the control of host system 22, in response to the user actuating the call-request key 35 indicating that the user assigned to that response unit is on a call list displayed to the instructor on display 34, as will be discussed in more detail below. A TALK indicator 68b is actuated by base unit 26, which issues a TALK COMMAND in response to a TALK INSTRUCTION issued by host computer 32. As will be set forth in more detail, when TALK indicator 68b is illuminated, an audio channel is opened between microphone 46 of that response unit 24 and host system 22.

Response unit 24 additionally includes a microcontroller, or microprocessor, 40 which is interconnected with keypad 36 and display 38 for active interface with the user of the response unit. A power management circuit 44 activates audio transmitter 47a and data transceiver 42 only when a transmission is to occur in order to conserve the life of battery 45. In the illustrated embodiment, audio transmitter 47a is a four-channel audio transmitter which transmits in the frequency range of at least 500 megahertz and preferably in the range of approximately 800 megahertz. More preferably, audio transmitter 47a transmits four channels in the 800 to 805 megahertz range. This frequency range is much higher than would be required to provide wireless communication of audio signals. However, the higher frequency range reduces the size of antennae 48a to be able to fit within the housing of the response unit. Additionally, this frequency range accommodates multiple channels which facilitates a clear channel by choosing between the channels. Data transceiver 42 includes a data transmitter 42T which transmits over one of eight channels in the 345 to 370 megahertz range. Data transceiver 42 additionally includes a separate receiver 42R, which receives up to eight channels in the 216 to 220 megahertz range.

Base unit 26 includes an audio receiver 47b and corresponding antennae 48b, which is provided as an input to an audio-processing circuit 130. Audio receiver 47b is configured to receive audio signals transmitted by the audio transmitter 47a of each response unit 24. Audio-processing circuit 130 has an output 132 utilized for local site distribution and a connection with a phone circuit 49 which is provided to audio link 84 for transmission to host system 22 of audio signals inputted to the microphone 46 of a response unit 24 whose audio transmitter 47a is activated in a manner which will be set forth in detail below. Phone circuit 49 is POTS compatible and includes a dialer. Audio-processing circuit 130 additionally receives an audio signal 94 from demodulator 92 and produces an output 100 which is supplied to the presentation monitor 98 under the control of a microcontroller 134. Microcontroller 134 interfaces with a master RF microcontroller 136 which formats base data packets for transmission to response units 24 by an address transmitter 138. Master RF microcontroller 136 additionally receives and decodes response data packets received from response units 24 using a response receiver 140. A second response receiver 142 communicates with a slave RF microcontroller 144, which, in turn, communicates with master RF microcontroller 136. Response receivers 140, 142 operate in the same bands as transmitter 42T of each response unit. Address transmitter 138 operates in the same band as receiver 42R of each response unit. Redundant response receivers 140, 142 enhance the capability of the base unit in receiving a response from each response unit. Thus, for example, if a response unit is in a "blind spot" with respect to one of the receivers 140, 142, it is possible that the other receiver will receive the signal. Base unit 26 additionally includes a pair of serial ports 146 for interconnection with data modem 82*a*. Serial ports 146 may be in the RS232 or other conventional format. Base unit 26 additionally includes a keypad 148, display 150 and a speaker 152 for use by an operator in setup.

The operation of base controller 26 and response units 24 generally is disclosed in U.S. Pat. No. 5,724,357 issued to Harry G. Derks for a REMOTE RESPONSE SYSTEM AND DATA TRANSFER PROTOCOL, the disclosure of which is hereby incorporated herein by reference. Address transmitter 138 and response receivers 140, 142 in the base unit and transmitter 42T and receiver 42R in each response unit provide an FM data communication link between base unit 26 and the response units 24 in the form of a half-duplex channel in which a base data packet 50 is transmitted by base unit 26 to all remote response units and response data packets 52 are transmitted from each response unit 24 to base unit 26 individually within a time slot that is assigned to each response unit. In the illustrated embodiment, up to 250 response units communicate within one of eight channels in the data communication link in response to a base data packet 52. Alternatively, the 250 response units may be divided into groups in a manner which will be explained in more detail below, wherein fewer than the entire 250 units respond to a base data packet. Because, in the illustrated embodiment, the system utilizes eight communication channels, the system is capable of handling 2,000 response units from a single base unit 24 at a site 25 separated from central location 21.

Figure 6:
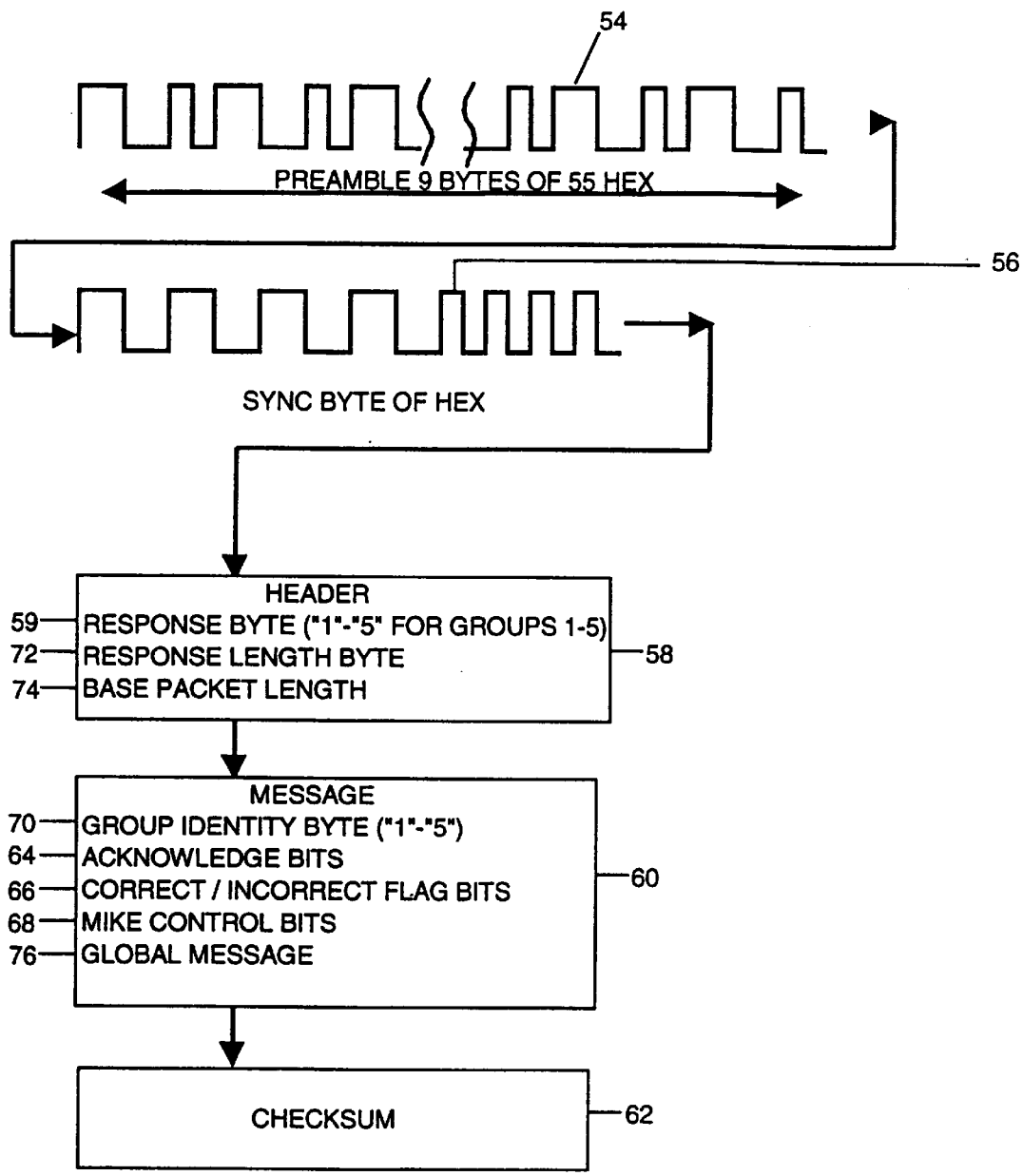
FIG. 6 is a graph illustrating the structure of a base data packet sent by the base unit.
Figure 7:
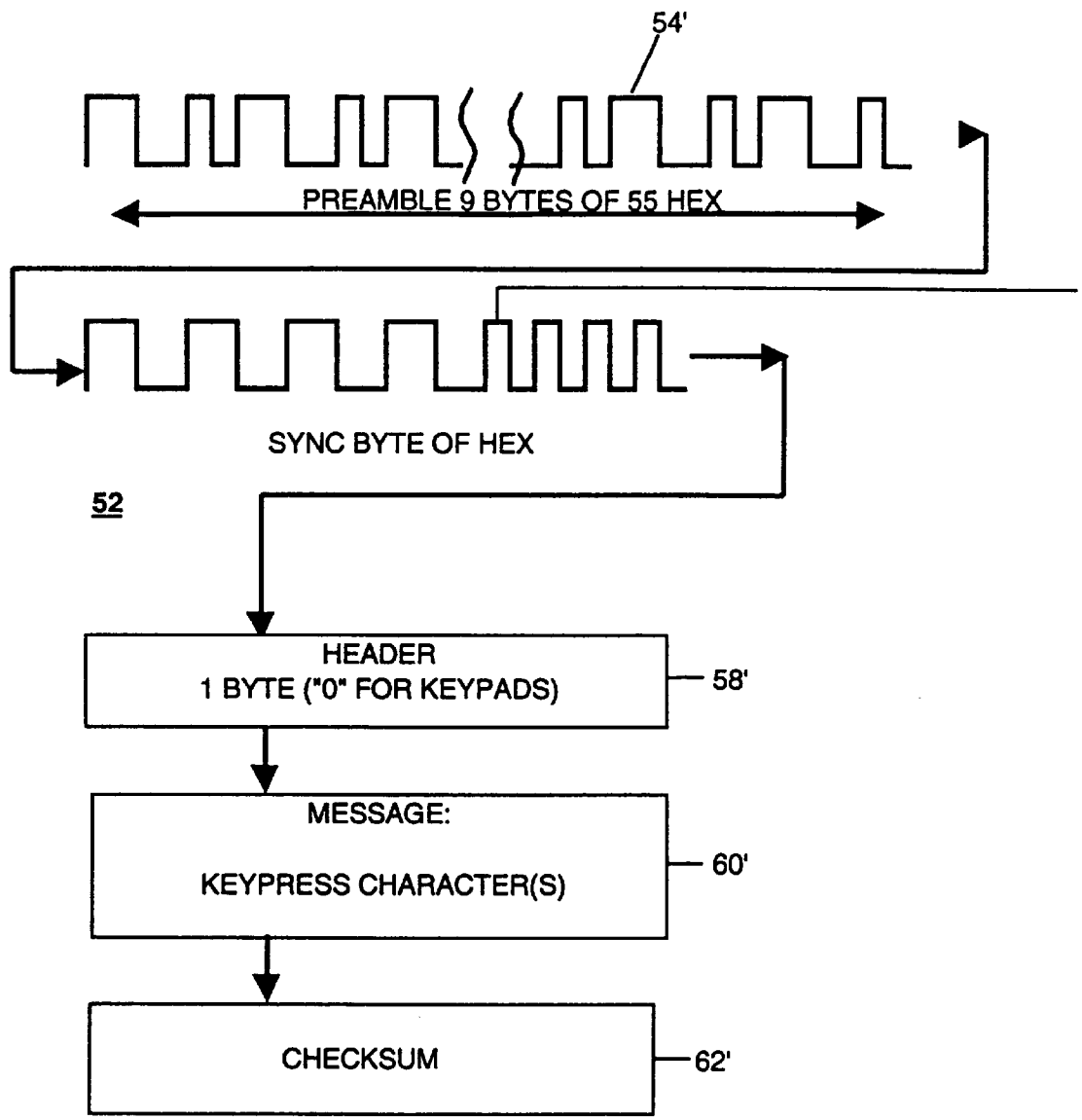
FIG. 7 is a graph illustrating the structure of a response data packet sent by each response unit.

Base data packet 50 and response data packet 52 each include a preamble 54, 54' composed of nine bits of 55 hex, which identifies the transmission as a data packet (FIGS. 6 and 7). The content of the preamble is sufficiently distinct to preclude false recognition resulting from various EMI sources. The preamble 54, 54' is followed by a sync byte 56, 56' which provides a timing mark for enabling the response units to be coordinated in their response intervals. The remaining of each data packet 50, 52 is made up of a HEADER 58, 58'; a MESSAGE 60, 60'; and a CHECK SUM 60, 62'. HEADER 58 may include a one-byte response character field 59, which identifies which of five groups of remote response units 24 are to transmit a response data packet in response to that base data packet. For large groups of response units, such as 250 units, it is convenient to divide the units into groups of, for example, 50 units. This provides flexibility in system deployment of various numbers of response units by eliminating the response intervals for phantom response units. Response character field 58' includes a 0 character in order to identify the data packet as a response data packet 52.

HEADER 58 may additionally include a Response Length Byte 72, which instructs the response units of the number of characters to include in the MESSAGE field 60'. This allows the transmittal of responses longer than a single character under the control of the base unit. HEADER 58 may additionally include a Base Packet Length field to instruct the remote response unit of the number of characters in the base data packet 50. This allows the transmitting of messages in various lengths globally to all response units in a GLOBAL MESSAGE field 76. MESSAGE field 60 includes a group of characters 64, 66, 68 and 70 that are individually pertinent to particular response units. The data in MESSAGE field 60 is structured so that each response unit 24 is capable of identifying which character, or characters, pertain to that particular unit. However, the entire content of MESSAGE field 60 is received by all response units and loaded into the memory thereof. Each individual response unit examines the character location, or locations, assigned to that particular unit and responds to the value of the character at that particular location.

MESSAGE field 60 includes a data structure of Acknowledge Bits field 64, which signify to the response units to which each bit pertains, whether the previous response data packet transmitted by that unit was validly received at base unit 26. A field of correct/incorrect flag bits 66 identify to each response unit whether the response contained in the previous response data packet entered by the user was correct or incorrect. The value of the correct/incorrect flag bit is set by computer 32 by comparing received responses with a correct answer key. MESSAGE field 60 additionally includes microphone control bits 68. Each microphone control bit 68 is a CALL COMMAND transmitted by base unit 26 in response to a CALL INSTRUCTION from host computer 32. Each microphone control bit 68 is assigned to a particular response unit, in a group of response units and, when set, is processed by microcomputer 40. In response to a microphone control bit being set, microcomputer 40 actuates audio transmitter 47*a* for that particular response unit in order to provide a one-way audio communication from that response unit to base unit 26 through audio receiver 47*b* and over a phone circuit dialer 49 to central location 21. Alternatively, the CALL COMMAND could be established in a separate field at the end of MESSAGE field 60 in which the CALL COMMAND is combined with an address of the response unit to which it pertains. This alternative protocol is preferred because it reduces the data overhead required by a protocol which sets aside a separate microphone control bit 68 in MESSAGE field 60 for each response unit in the group. This is because typically only one response unit in a group will receive a microphone control bit at a time. It should be understood that, in order to maintain an audio connection between the microphone 46 of a particular response unit and host system 22, it is necessary, in the illustrated embodiment, that a CALL COMMAND be sent with each base data packet 50 and that, if the CALL COMMAND control bit is no longer sent to a particular response unit, the audio connection with the host system is terminated.

MESSAGE field 60 may additionally include a GLOBAL MESSAGE field 76 containing characters which globally pertain to all, or a group of, response units 24. CHECK SUM 60, 62' provides an error detection byte at the end of each base data packet or response data packet. This byte is set to the value of the least significant byte of the sum of all bytes in the respective data packet, in order to ensure that a valid reception of the packet is accomplished, as is understood by those skilled in the art.

Response data packet 52 includes the response message, including any key presses entered by the user, in MESSAGE field 60'. In one embodiment, the response in MESSAGE field 60' is a single character, which is produced by a single keystroke entered with keypad 36. Alternatively, the response in MESSAGE field 60' may be multiple characters in length, the number of characters either fixed or designated by Response Length Byte 72. This allows base unit 26 to control the length of the response from the response data packet 52. MESSAGE field 60' additionally includes two control bits which indicate the nature of the message transmitted. For example, a log-in operation, initiated by actuation of log-in key 78, is one mode. Another mode is evoked by the enter key 77. Yet, another mode is entered by activation of call-request key 35. The base unit deciphers the two control bits in order to interpret the nature of the content of MESSAGE field 60'. In the illustrated embodiment, the length of MESSAGE field 60' is ten characters, although, as previously set forth, this length could be one character or a variable character length as established by Response Length Byte 72 in the base data packet. Advantageously, base unit 26 can be set to receive single character responses, without mode designation bits, CALL REQUESTS or multiple character responses, in order to provide backward compatibility with a wireless response unit of the type disclosed in U.S. Pat. No. 5,093,786 issued to Harry G. Derks for a REMOTE RESPONSE SYSTEM, the disclosure of which is hereby incorporated herein by reference. The remaining details of the communication between base unit 26 and response units 24 are disclosed in detail in the previously referred to Derks U.S. Pat. No. 5,724,357 and will not be repeated herein.

Figure 8A:
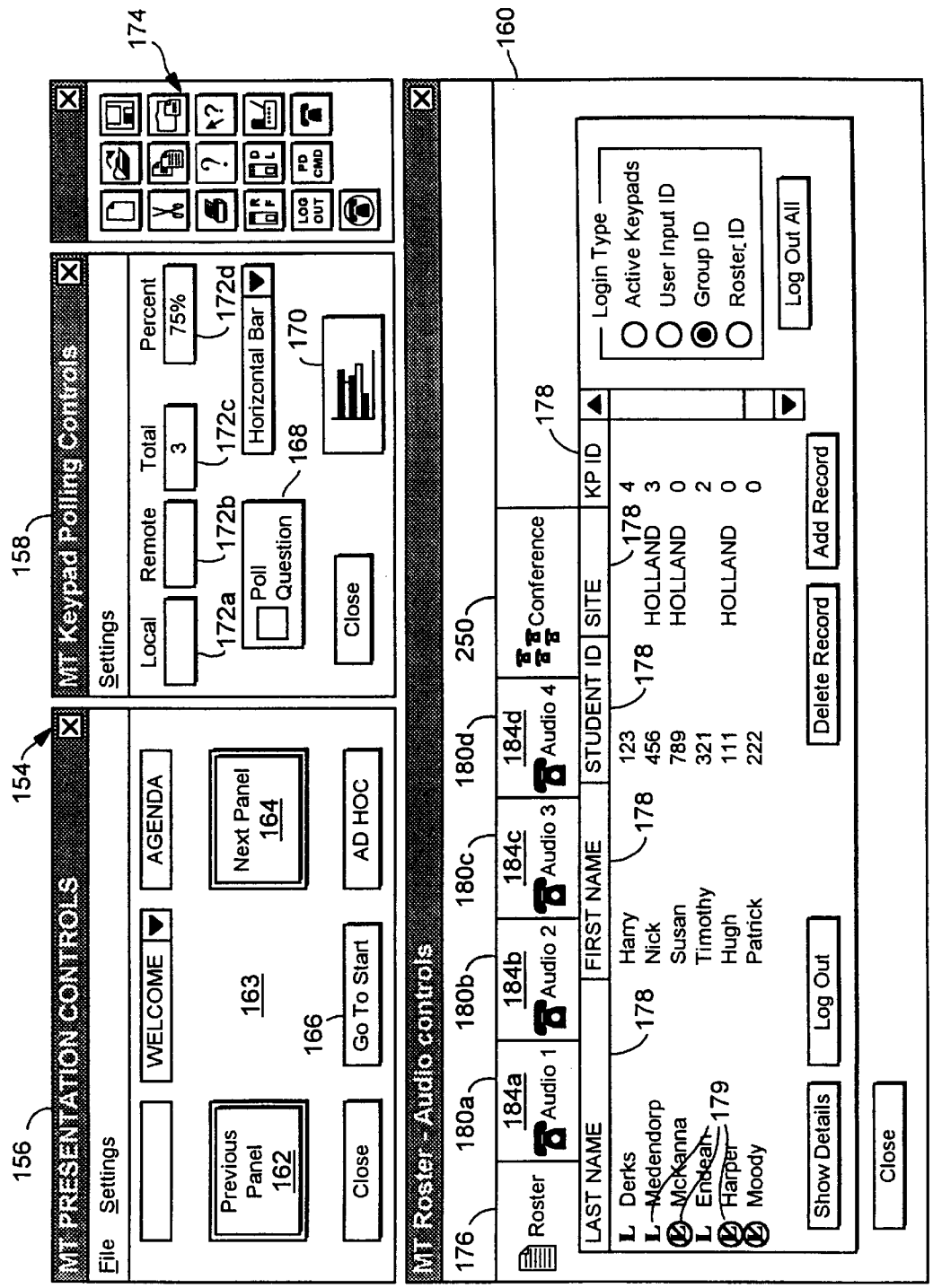
FIGS. 8A–8C are a series of graphic displays generated by the host system computer.

In order to provide communication with an instructor, and to provide an instructor selection device, host computer 32 produces with display 34 an instructor control screen 154 (FIG. 8A). Control screen 154 includes a presentation control section 156, a keypad, or response unit, polling control section 158 and a master roster/audio control section 160. Presentation control section 156 receives user input selections at 162 and 164, respectively, for selecting the previous panel or the next panel in a sequence of presentation panels, for example, stored in computer 32. Each selection panel 162, 164 may include a miniature display of the respective previous and next panels. A display section 163 provides a miniature display of the current panel being presented to remote sites 23. A "go to start" selection 166 initiates the beginning of a presentation. Keypad, or response unit, polling control section 158 includes a poll question selection 168 which allows the instructor to initiate the polling process at each remote site 23. A "display type" selection 170 allows the instructor to select the type of chart to be used in a display panel showing, on a real-time basis, the responses received from the users to the poll question. "Local," "remote," "total" and "percent" display fields 172a–172d display to the instructor the number of responses obtained during the current polling cycle. A series of miscellaneous selections including editing, printing, and the like functions are provided at a tool bar 174.

Roster/audio control section 160 includes a roster selection 176 which, when selected, allows the instructor to establish and edit a roster of possible students, or users, to be connected with the host system 22. When roster selection 176 is made, the instructor is presented with a series of fields 178, which describe the current users at the remote sites. The fields are instructor definable. For example, in the embodiment illustrated in FIG. 8A, the last name and the first name of each user is listed, along with a student identification number, the remote site, and hardware identification code of the response unit. The student identification number could be that assigned by a school, the user's social security number or even a credit card number. The latter may be utilized in commercial settings in which the user may wish to be asked to purchase items discussed in a survey or the like. The roster data is entered and edited from a general list of students. As a student, or user, logs in, by actuating log-in key 78 and entering the student identification number, computer 32 determines if the entered number matches a student identification number in the roster. If so, the user is considered logged in and a log-in status indication 179 is changed on the roster.

Figure 8B:
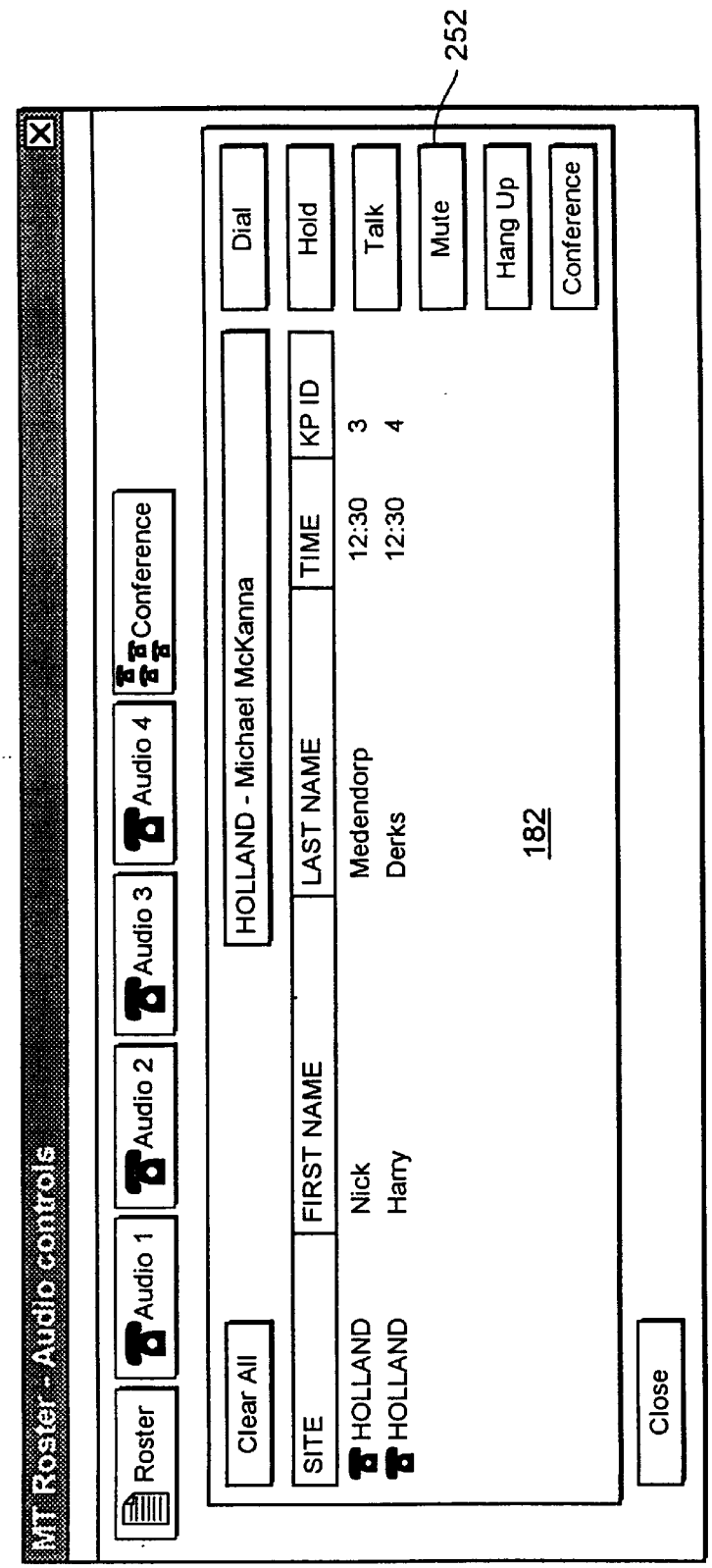

The roster may include additional fields that list various characteristics of the users, such to as home address, educational background, gender, and the like. The instructor is provided with a call list feature which is evoked by actuating one of multiple call list selectors designated "audio 1 (180a)," "audio 2 (180b)," "audio 3 (180c)" and "audio 4 (180d)." During an edit function, the instructor is provided the tools to select for each of the call lists 180a–180d a characteristic, or combination of characteristics, of users which is to be utilized to place users on one or more of the four call lists. Computer 32 places a user on a particular call list if the user actuates the call-request key 35 on the assigned response unit and the characteristic(s) selected by the instructor for that call list matches a characteristic, or combination of characteristics, of that user. Four audio lists are illustrated so that the instructor may establish multiple lists, each having its own characteristic(s). In this manner, the instructor is provided the tools to manage incoming calls by directing the calls into categories established by the instructor. If the caller does not have a characteristic in the roster for that user that matches one of the call lists, the caller is not placed on a call list unless the instructor chooses to establish a universal list of all callers. By selecting one of the call lists 180a–180d, the selected list is displayed at 182 on instructor control screen 154 as illustrated in FIG. 8B. Each displayed call list 182 shows information about each call and may additionally list the criteria established for that call list.

In order to manage the call lists, a call-request routine 186 is repetitively carried out by host computer 32. At the beginning of each pass through the routine, it is determined at 188 whether the instructor has set up criteria, or characteristic(s), for each call list. If not, the instructor is prompted at 190 to select from the roster database fields characteristics for inclusion on each of the call lists 1–4. After the call list criteria are established, the incoming call-request buffer is checked at 192 to determine at 194 if a new call request has come in from a response unit. If so, the record for the caller is retrieved from the roster database at 196 and it is determined at 198 whether it matches the criteria for call list number 1. If so, the caller is placed on call list number 1 at 200. If the caller characteristic does not match list number 1 criteria, it is determined at 202 if it matches list number 2 criteria. If so, the caller is placed on list number 2 at 204. If the caller characteristic does not match the list number 2 criteria, it is determined at 206 whether it matches the criteria for list number 3. If so, the user is placed in call list number 3 at 208. If the characteristic of the caller does not match the criteria of lists 1–3, it is determined at 210 if the characteristic of the user matches the criteria of list number 4. If so, the user is placed in list number 4 at 212. After a caller is placed on a call list, the instructor screen 160 is updated at 214 and the routine returns to 192 in order to watch for the next incoming call. If the characteristic of the user does not match any list criteria, the call request is cancelled at 216 and a call cancel instruction is sent from host computer 32 to the base unit 26 corresponding to the caller. This is accomplished by the base unit 26 formatting a base data packet for the corresponding response unit which no longer includes a data bit illuminating the WAIT indicator 68a, thus extinguishing the WAIT indicator.

Calls are placed on each established call list on a first-in-first-on-list basis. The instructor may display a call list at 152 by actuating the corresponding selection 180a–180d using a locating instrument, such as a "mouse," or, if display 34 is a touch responsive display, by touching the appropriate selection 180a–180d. The callers on the associated call list will be displayed at 182, and the instructor may scroll through the list and select a user that the instructor wishes to connect with the host system using the locating instrument. When a particular student, or user, is selected in this manner, host computer 32 transmits a CALL INSTRUCTION to the base unit 26 at the geographically separated site of that user. The corresponding base unit sends a CALL COMMAND to the corresponding response unit, thereby actuating the audio transmitter for that user. Host computer 32 concurrently instructs phone line manager 86 to connect the audio link 84 corresponding to the geographically separated site of the selected user to headphone 126 and mixer/amplifier 188. This allows the selected user to speak to the instructor through the microphone 46 of that user's response unit, which is transmitted to all of the remote systems 23 by the audio/video link 88. In this manner, the user may carry on a conversation with the instructor by the instructor speaking into headset microphone 124, which is also combined with the audio signal of the selected user by mixer/amplifier 118 and communicated to each remote system. In this manner, the conversation between the selected user and the instructor is heard at each geographically separated site.

In order to provide additional tools for managing a call list, each call list selection 180*a*–180*d* includes a background field 184*a*–184*d*. Each background field, in the illustrated embodiment, may be colored a green, yellow or red color. Threshold levels may be established in host computer 32 by the operator in order to monitor callers on each call list, which, in turn, is used to establish the color for the background 184*a*–184*d*. In particular, a first threshold, which is selectable by the instructor, is provided to establish a green background 184*a*–184*d*. If the callers listed on the corresponding call list are fewer than the selected threshold, the green color will appear. A second, higher, threshold may be selected by the instructor. If the callers on a particular call list are more than the first threshold, but fewer than the second threshold, the color of the corresponding background 184*a*–184*d* will switch to yellow. If the callers on the call list are more than the second, upper, threshold, the color of the corresponding background 184*a*–184*d* switches to red. This provides status information to the instructor to allow the instructor to better manage the call lists by determining if one particular call list requires more immediate attention than the others.

Figure 10:
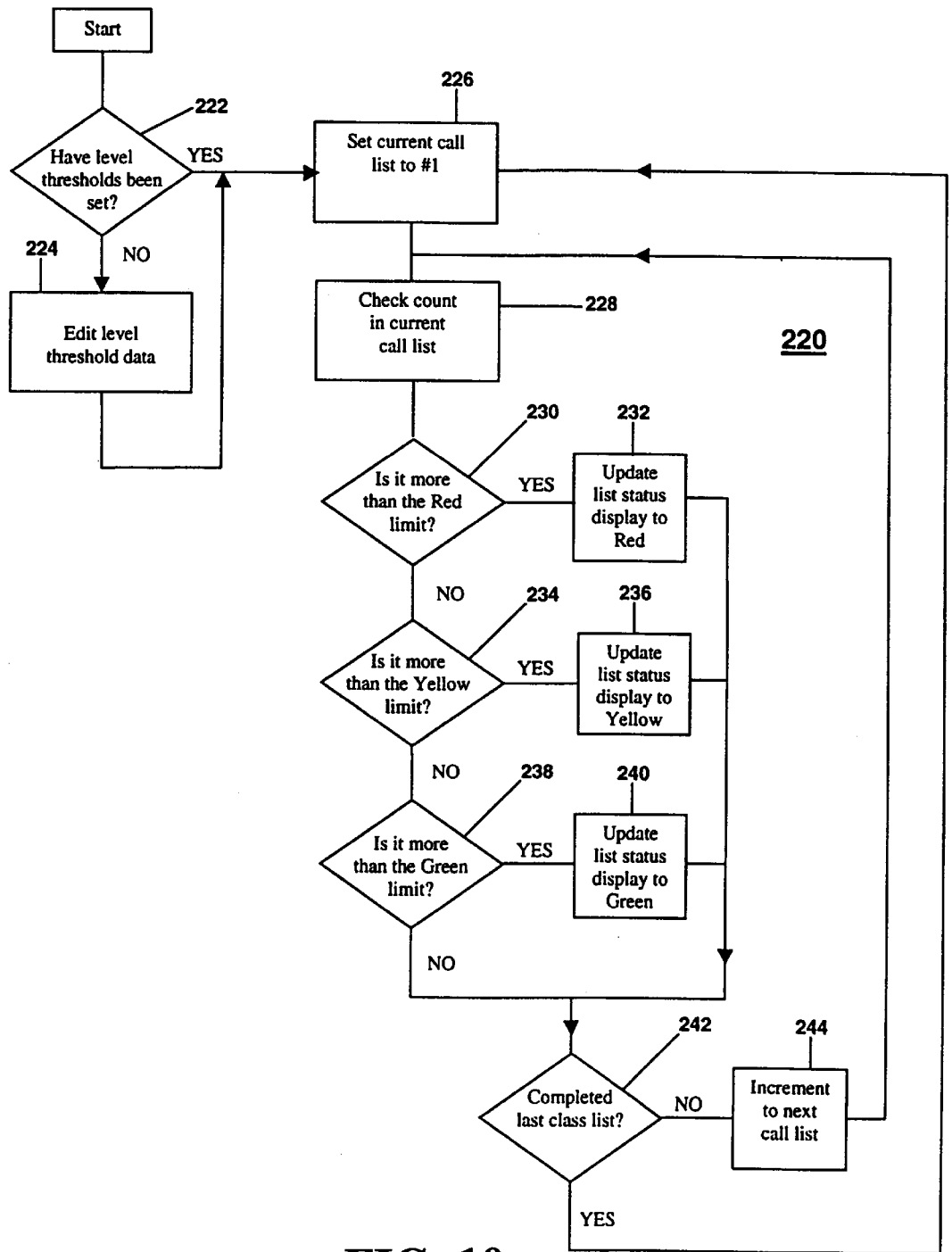
FIG. 10 is a flowchart of a call-request list status designator routine.

A call-request list status designator routine 220 is provided in order to control the color of backgrounds 184*a*–184*d* (FIG. 10). Routine 220 is repetitively carried out by host computer 32 and begins by determining whether the instructor has set all threshold levels at 222. If not, the instructor is prompted to edit the threshold data at 224. After the thresholds have been set, the routine sets a pointer to the first call list at 226 and checks the call count for that list at 228. It is then determined at 230 whether the calls on that call list are more than the highest limit set. If so, the background for the list selection is set to a red color at 232. If the calls on the call list are fewer than the upper threshold, it is determined at 232 if the calls on the call list are more than the lower threshold. If so, the background for that call list selection 180*a*–180*d* is set to yellow at 236. If the calls on the call list are fewer than both limits, it is determined at 238 whether the calls are more than a low limit, which may be set to zero. If so, the corresponding background is switched to green at 240. It is then determined if all of the call lists have been examined at 242. If it is determined at 242 that additional call lists must be processed, the routine increments at 244 to the next call list and checks the count in that call list at 228 in order to process that list. Call requests are received on a real-time basis. After it is determined at 242 that all of the call lists have been processed, the routine returns to 226 in order to update all call lists.

Call-request list status designator routine 220 may additionally provide a timer to monitor the length of time that a call request is present on any call list 182. After a caller has been on the list for more than a predetermined period of time, host computer 32 may take an action to avoid excessive wait on a call list. The reason is that, each response unit 24 has a sleep mode in which the microcomputer 40 configures its I/O ports for low power draw and falls asleep. The response unit is not powered down, except between sessions with the instructor. If, however, a call request is placed by a response unit, the response unit will not fall asleep. Therefore, while a user is waiting in a call list, the associated response unit is operating at higher power consumption which shortens the life span of battery 45. Therefore, interactive response system 20 takes action to reduce the pendency of callers on the call lists 182. One action may be to flash the name of a caller who has been on a call list for more than a predetermined period of time. Another action may be to disconnect, or drop, the caller from the call list after the caller has been on the call list for a predetermined period of time. Both actions could be combined such that the caller's name is flashed after a first predetermined period of time and the caller is dropped after a second, longer, predetermined period of time.

Figure 8C:
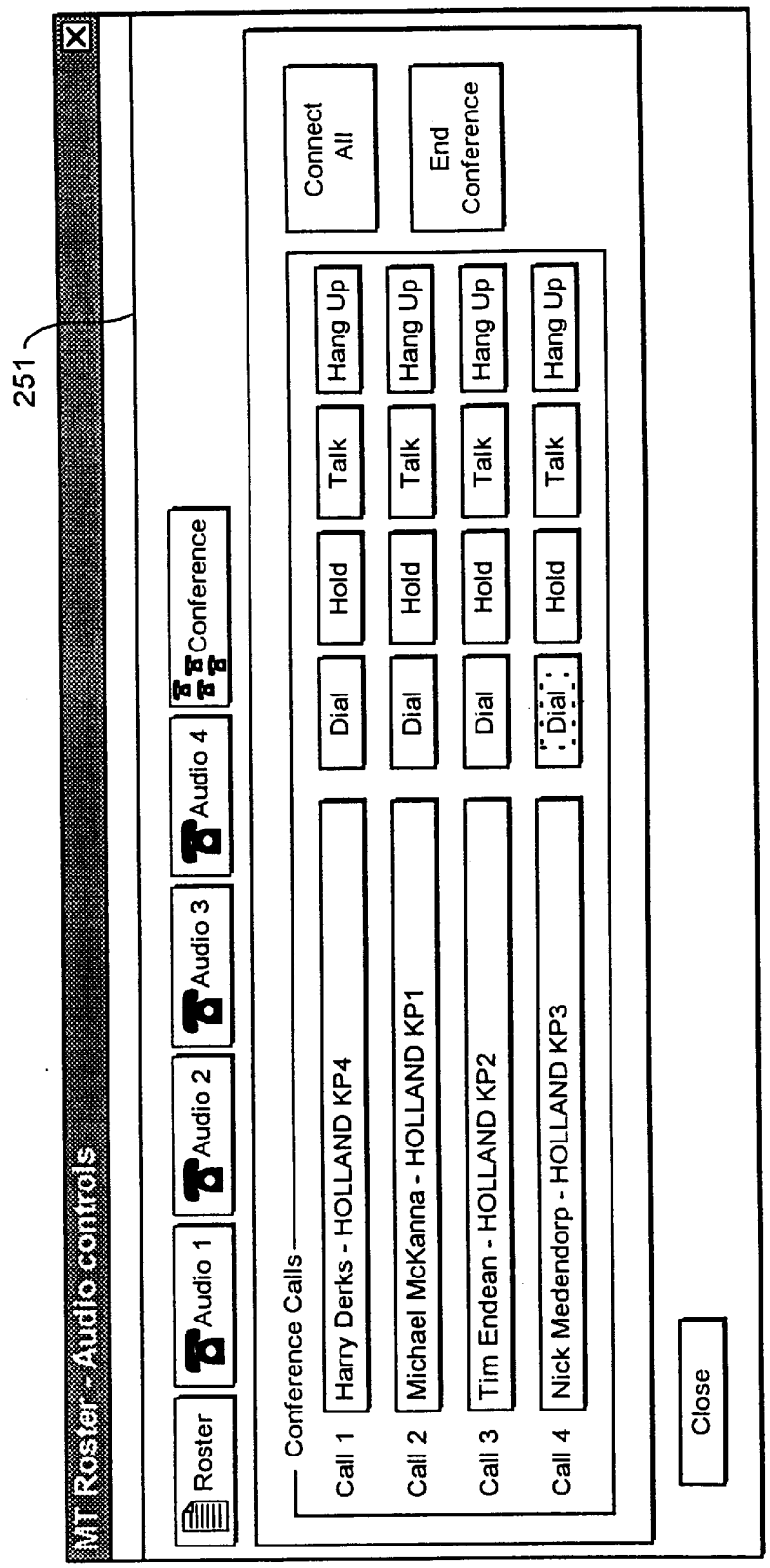
Figure 9:
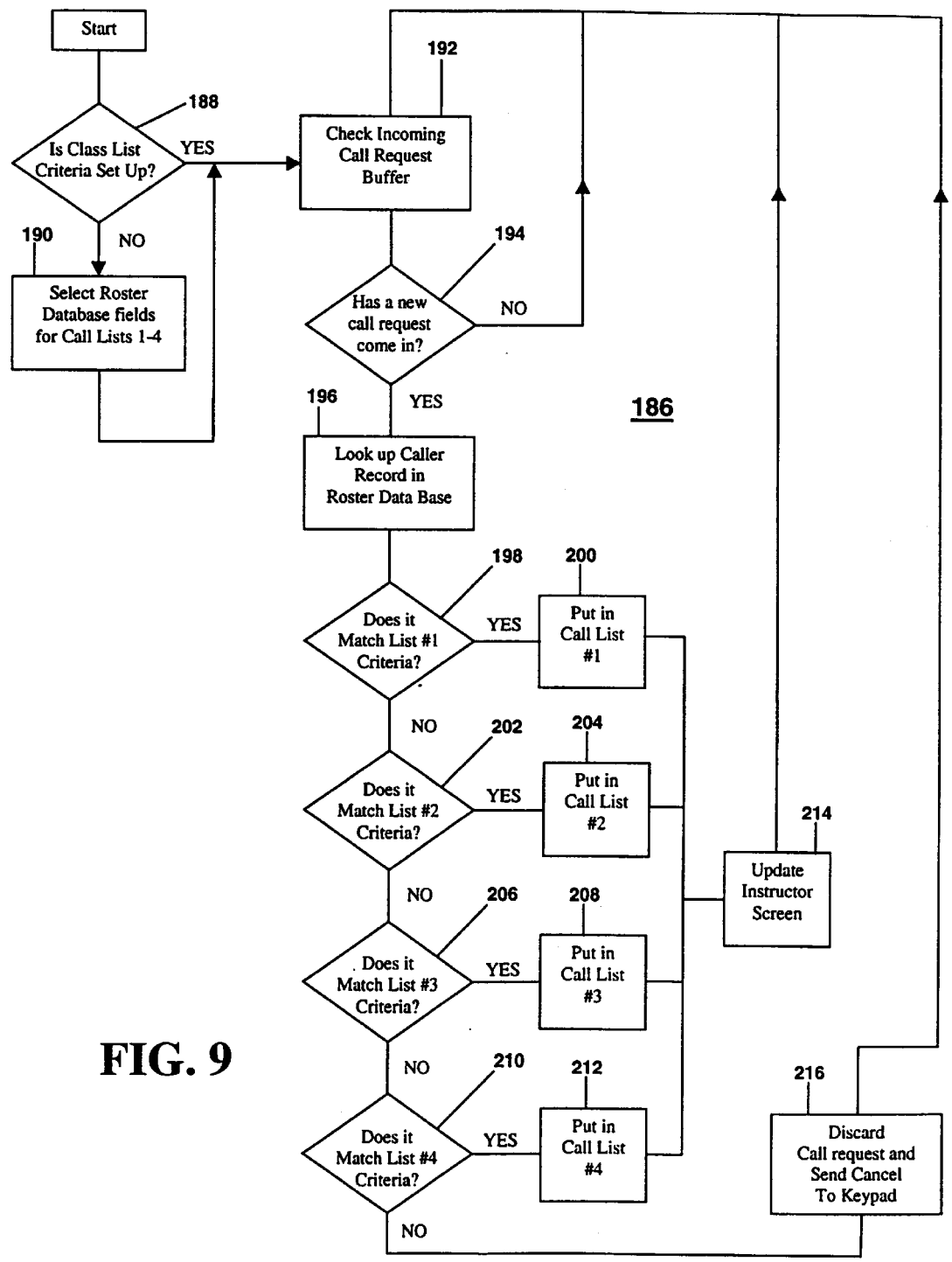
FIG. 9 is a flowchart of a call-request list management routine.

The roster/control section 160 is additionally provided with a conference selection 250, which, when selected by the instructor, allows the instructor to select multiple callers from the displayed call list 182. When the conference selection is made and multiple callers selected utilizing the instructor selection device, each of the response units of the selected callers is displayed on a conference control screen 251 (FIG. 8C). Conference control screen 251 provides the instructor with multiple choices for handling each of the selected callers. If either a "dial," a "hold" or a "talk" selection is made for any selected caller, the corresponding response unit is provided with an audio connection to mixer/amplifier 118. All of the selected callers who are selected to "talk" are placed in a conference such that the selected callers can speak with one another and the instructor. The conversation among the selected callers and the instructor will be presented to the remote system 23 at each geographically separated site 25. This feature allows a group selected by the instructor to carry on a conversation which may be overheard by all of the users. This greatly enhances the capability of the interactive response system by providing interaction not only with the instruction but among the users at the geographically separated sites.

Whenever a caller is speaking over audio link 84 which raises the audio signal above a threshold, host computer 32 blanks the audio feed over audio/video link 88. Likewise, when the instructor is speaking over audio/video link 88, the base unit 26 at the geographically separated site 25 at which the caller is located blanks the audio output 100 to the corresponding monitor 98. This audio suppression prevents feedback as is well known in the art. Interactive response system 20 additionally includes an instructor override 252 selection which, when selected by the instructor, causes the corresponding base unit 26 to suppress the audio signal of the caller in order to allow the instructor to take control of the audio communication connection between the caller and the instructor (FIG. 8B). This manual override, or mute, prevents a caller from holding onto the line by talking continuously and thereby preventing the instructor from speaking. By allowing the instructor a manual override to blank out the talkative caller, the instructor can interrupt without having to drop the caller altogether.

Figure 11:
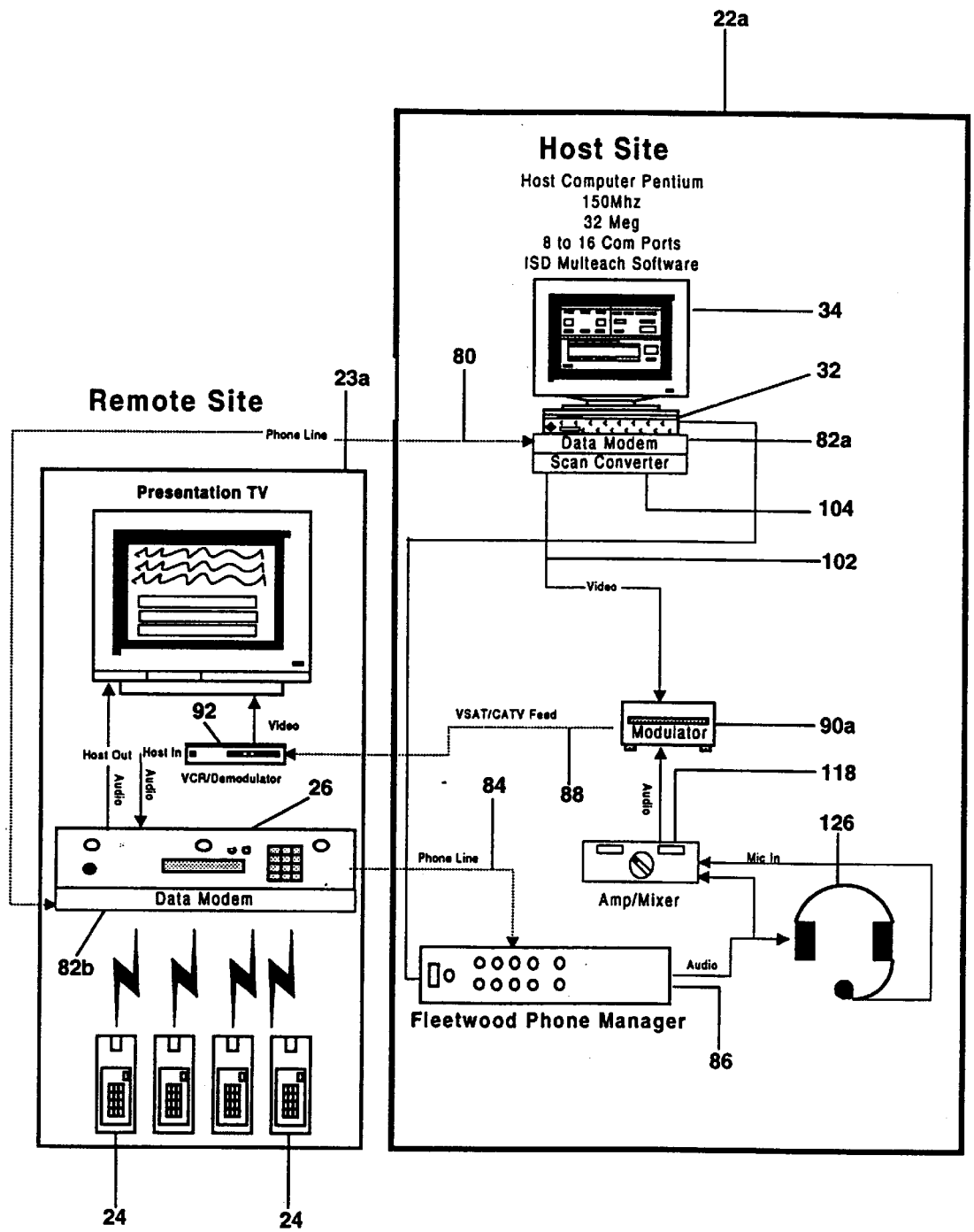
FIG. 11 is a block diagram of one embodiment of an interactive response system according to the invention.

An interactive response system described herein is capable of various configurations and communication connectivity. A basic interactive response system 20*a* includes a host system 22*a* having an audio/video modulator 90*a* which combines the output of mixer/amplifier 118 with the audio input 102 developed by scan converter 104 in order to produce an audio/video signal on audio/video link 88 (FIG. 11). Digital data link 80 is over a POTS line interconnecting data modem 82*a* and 82*b*.

Figure 12:
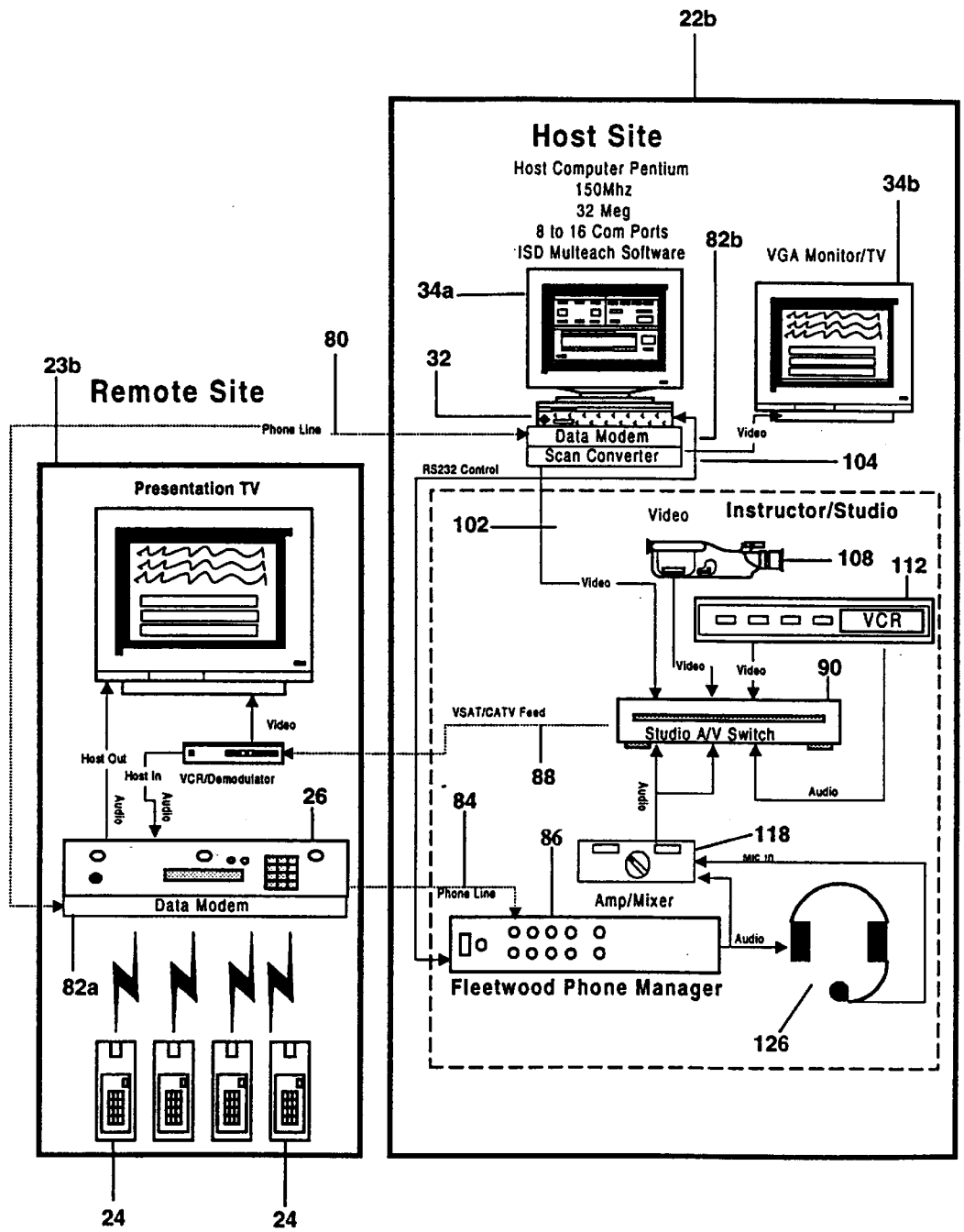
FIG. 12 is the same view as FIG. 11 of a first alternative embodiment.

An interactive response system 20*b* includes a host system 22*b*, which, in addition to the components of host system 22*a*, includes separate video displays 34*a* and 34*b* and multiple video sources (FIG. 12). Video display 34*a* is available for controlling response unit polling questions, as well as roster and call list management. Display unit 34*b* is available to display images being presented to the remote systems 23*b* as part of the instructor's instructional program.

An interactive response system 20*c* includes a plurality of remote systems 23*c* shown interconnected with host system 22*c* by an audio/video feed 88*a*–88*d* to each geographically separated system and by a phone line 84*a*–84*d* from each geographically separated system (FIG. 13). This is to illustrate the expandability of the interactive response system to include a potentially large number of geographically separated, or remote, sites. Indeed, host system 22 may be located at the same geographically separated site 25 as one of the remote systems 23*c* or geographically remote from all of the sites. Sites may be geographically separated by being in different rooms in the same building or being at opposite sides of the earth.

Figure 14:
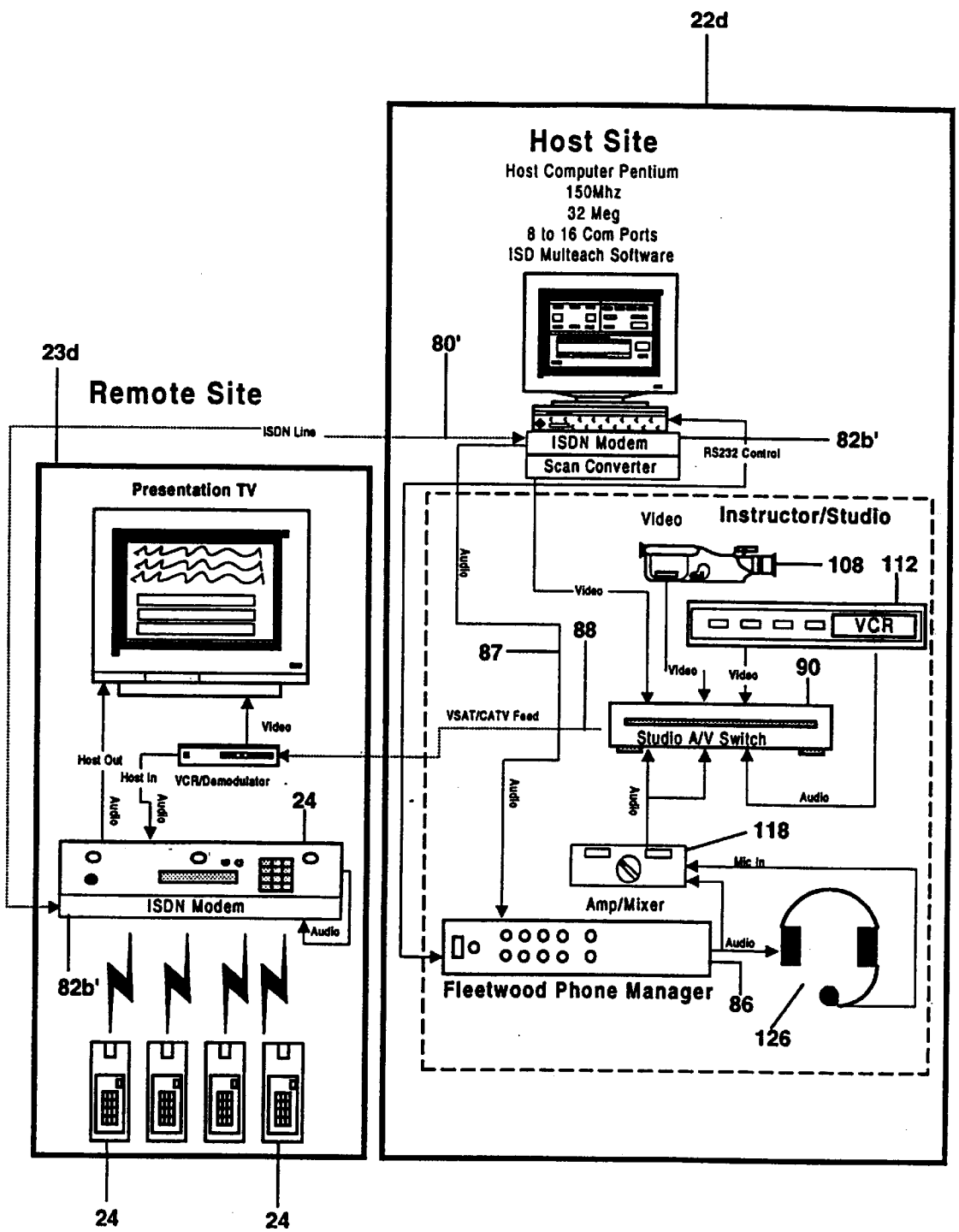
FIG. 14 is the same view as FIG. 11 of a third alternative embodiment.

An interactive response system 20*d* combines audio link 84 with data link 80' over an ISDN line (FIG. 14). ISDN service provides multiple channels for combining audio and data signals in a manner well known in the art. Alternatively, a digital simultaneous voice and data (DSVD) system may be utilized to combine data link 80 and audio link 84 over a common POTS phone line. This reduces the number of interconnections between the host system and each remote system.

Figure 15:
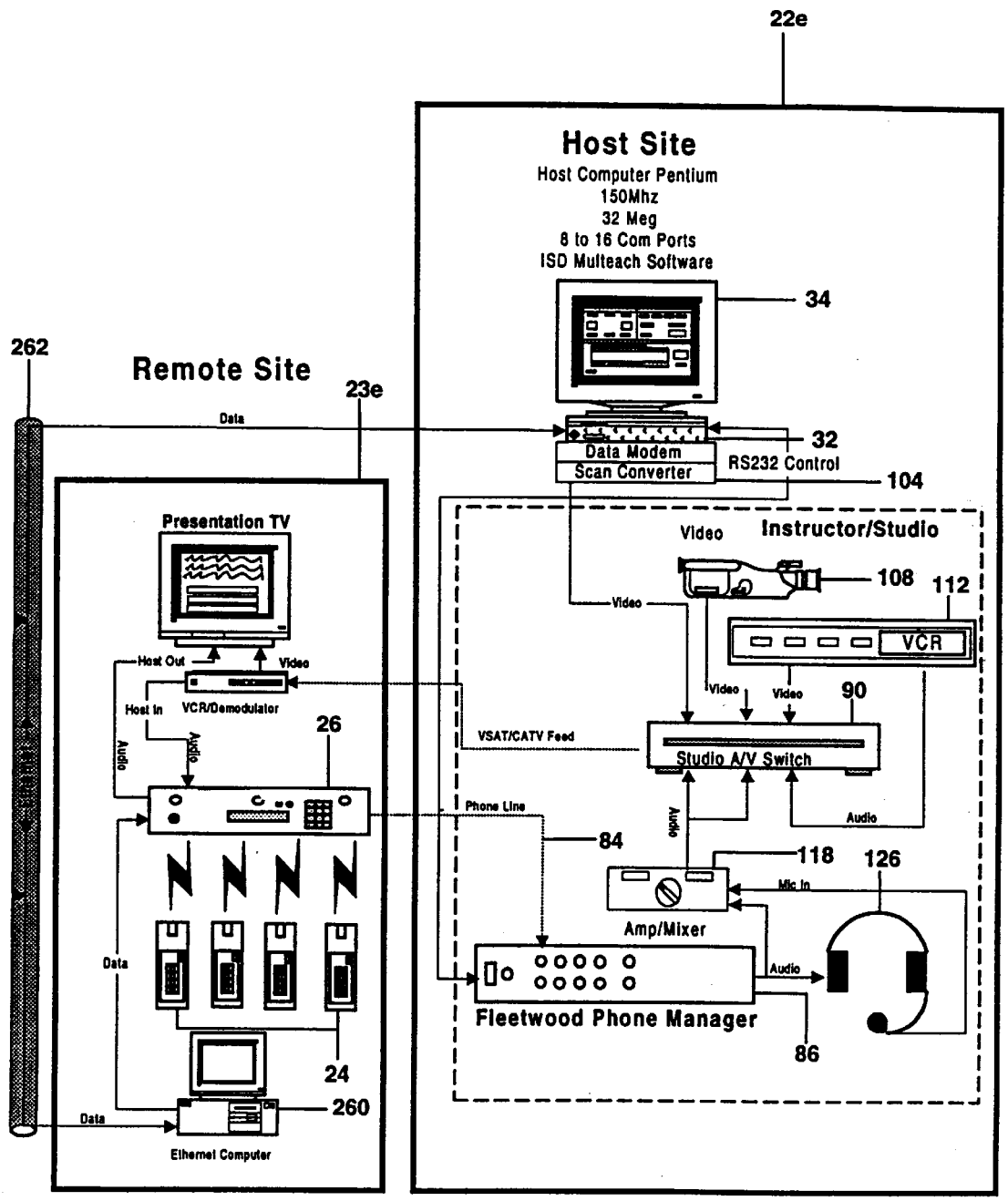
FIG. 15 is the same view as FIG. 11 of a fourth alternative embodiment.

An interactive response system 20*e* includes an Ethernet computer 260 (FIG. 15). Ethernet computer 260 supports a local area, or wide area, Ethernet network 262 interconnecting all of the remote systems 23*e* with host system 22*e*. Alternative local area networks and wide area networks may include Token ring networks. Other communication network connectivity between the host system and remote systems may be utilized including packet network, such as X.25 and frame relay networks. Additionally, asynchronous transfer mode (ATM) data transfer may be used. Data and audio communication could be transferred over the Internet. Preferably, base unit 26 is constructed with a circuit card cage in order to accept phone controllers for the desired communication network type. Such slot-compatible phone controllers on a circuit board are commercially available from various sources. Audio/video link 88 may be supplied by VSAT microwave satellite link or by CATV cable system or any conventional audio/video long-distance connectivity.

Changes and modifications in the specifically described embodiments can be carried out without departing from the principles of the invention, which is intended to be limited only by the scope of the appended claims, as interpreted according to the principles of patent law including the doctrine of equivalents.

The embodiments of the invention in which an exclusive property or privilege is claimed are defined as follows:

1. An interactive response system for retrieving at a central location responses from a plurality of users located at at least one geographically separated site and providing interaction between an instructor at the central location and said users, comprising:

a central control host system;

at least one wireless remote system geographically separated from said host system and interconnected with said host system through a communication network;

said remote system including a base unit and a plurality of response units coupled with said base unit through at least one wireless communication link;

each of said response units including a microphone, a user input device and a control, said response units communicate audio signals entered through said microphone over said wireless communication link to said base unit and over said communication network to said host system, said control communicating any inputs entered on said input device over said wireless communication link to said base unit.

2. The interactive response system in claim 1 wherein said wireless communication link includes a wireless data channel and a wireless audio channel, wherein each of said response units issues a talk request to request an audio connection with the host system and said base unit issues a talk command to cause a response unit to communicate said audio signals, said talk requests and said talk commands being communicated over said data channel, said audio signals being communicated over said audio channel.

3. The interactive response system in claim 2 wherein said audio channel includes an audio receiver in said base unit and an audio transmitter in each of said response unit which becomes active upon receipt of said talk command by that response unit.

4. The interactive response system in claim 2 wherein said data channel includes a first transmitter in said base unit and a first receiver in each response unit for communicating data signals including any talk commands from said base unit to said response units, and wherein said data channel includes a second transmitter in each of said response units and a second receiver in said base unit for communicating any inputs entered on each said input device, including said talk request from said response units to said base unit.

5. The interactive response system in claim 2 including a talk indicator on each of said response units, said talk indicator being activated in response to a talk command.

6. The interactive response system in claim 5 including a display on said host system having at least one call list for displaying response units sending said talk request.

7. The interactive response system in claim 6 including a wait indicator on each of said response units wherein said base unit sends a wait command to each response unit on said call list and said wait indicator is activated in response to said wait command.

8. The interactive response system in claim 6 wherein each of said response units includes a sleep mode during which power consumption is reduced and wherein each of said response units is inhibited from said sleep mode while on said call list and further wherein said host system monitors the length of time each of said response units is on said at least one call list and takes action after said length of time exceeds a particular value.

9. The interactive response system in claim 8 wherein said action includes one of providing an indication to an instruction and terminating the request for said audio connection.

10. The interactive response system in claim 9 wherein said action includes providing said indication to the instructor after a first predetermined length of time and deleting each of said response units from the at least one call list after a second predetermined length of time, wherein said second predetermined length of time is greater than said first predetermined length of time.

11. An interactive response system for retrieving at a central location responses from a plurality of users located at at least one geographically separated site and providing interaction between an instructor at the central location and said users, comprising:

a central control host system;

at least one wireless remote system geographically separated from said host system and interconnected with said host system through a communication network, said remote system including a base unit and a plurality of response units;

each of said response units includes a microphone and a wireless audio transmitter which is responsive to a talk command from the base unit to transmit audio signals received in said microphone to an audio receiver, each of said response units further including a first wireless data transmitter to transmit a call request and a first data receiver; and said base unit including said audio receiver for receiving an audio signal from one of said response units, a second data receiver to receive call requests from said response units and a second data transmitter for transmitting a talk command to a selectable one of said response units.

12. An interactive response system for retrieving at a central location responses from a plurality of users located at at least one geographically separated site and providing interaction between an instructor at the central location and said users, comprising:

a central control host system and at least one remote system geographically separated from said host system and interconnected with said host system through a communication network;

said at least one remote system including a base unit and a plurality of response units coupled with said base unit through a communication link, each said response unit including a microphone and a user input device wherein a user enters a call request for an audio connection with said host system using said user input device and said base unit establishes said audio connection between said microphone of one of said response units and said host system in response to a talk instruction from said host system;

said host system including a computer, an instructor selection device and a display, said computer defining a roster database of individuals including at least one characteristic of each individual, said computer generating at least one call list displayed on said display and receiving a selection of characteristics of individuals entered by said instructor selection device for inclusion on said at least one call list, wherein said computer retrieves individuals from said roster database who have entered a call request and also match the at least one characteristic entered by the instructor and displays the retrieved individuals on the at least one call list.

13. The interactive response system in claim 12 wherein said at least one call list comprises a plurality of call lists and wherein said computer receives said selection of characteristics of individuals independently for each of said call lists.

14. The interactive response system in claim 12 wherein said computer provides a status indicator on said display for said at least one call list.

15. The interactive response system in claim 14 wherein said status indicator produces a first indication if individuals listed on said at least one call list are fewer than a first level, a second indication if the individuals listed on said at least one call list are more than said first level and fewer than a second level and a third indication if the individuals listed on said at least one call list are more than said second level, said second level being greater than said first level.

16. The interactive response system in claim 12 wherein said computer monitors the length of time each individual is listed on said at least one call list and takes action after said length of time exceeds a particular value.

17. The interactive response system in claim 16 wherein said action includes one of providing an indication to the instructor and terminating the request for said audio connection.

18. The interactive response system in claim 16 wherein said action includes providing said indication to the instructor after a first predetermined length of time and deleting each of said response units from the at least one call list after a second predetermined length of time, wherein said second predetermined length of time is greater than said first predetermined length of time.

19. The interactive response system in claim 12 wherein said instructor selection device provides for the selection of at least one individual on said at least one call list and wherein said host system provides said talk instruction to the one of said response units associated with a selected individual, whereby said audio connection is established between the one of said response units associated with the selected individual and the host system.

20. The interactive response system in claim 19 wherein said instructor selection device provides for the selection of a plurality of individuals on said at least one call list and wherein said host system provides a talk instruction to the response unit associated with each of the selected individuals, whereby the plurality of selected individuals are conferenced together.

21. The interactive response system in claim 19 including an echo suppression system for suppressing an audio signal from said host system when an audio signal from the response unit of the selected individual is present and for suppressing said audio signal from the response unit of the selected individual when said audio signal from the host system is present.

22. The interactive response system in claim 21 wherein said instructor selection device provides an override for said echo suppression system to suppress said audio signal from the response unit of the selected individual.

23. An interactive response system for retrieving at a central location responses from a plurality of users located at at least one geographically separated site and providing interaction between an instructor at the central location and said users, comprising:

a central control host system and at least one remote system geographically separated from said host system and interconnected with said host system through a communication network;

said at least one remote system including a base unit and a plurality of response units coupled with said base unit through a communication link, each said response units including a microphone and a user input device wherein a user enters a call request for an audio connection with said host system using said user input device and said base unit establishes an audio connection between said microphone of one of said response units and said host system in response to a talk instruction from said host system; and said host system including a computer, an instructor selection device and a display, said computer generating a list displayed on said display of individuals who have entered a call request and including a status indicator on said display which produces a first indication if individuals listed on said list are fewer than a first level, a second indication if individuals listed on said list are more than said first level and fewer than a second level and a third indication if the individuals listed on said list are more than a second level, said second level being greater than said first level.

24. The interactive response system in claim 23 wherein said first indication is green colored, said second indication is yellow colored and said third indication is red colored.

25. The interactive response system in claim 23 wherein each of said first and second levels are selectable by the instructor.

26. An interactive response system for retrieving at a central location responses from a plurality of users located at at least one geographically separated site and providing interaction between an instructor at the central location and said users, comprising:

a central control host system and at least one remote system geographically separated from said host system and interconnected with said host system through a communication network;

said at least one remote system including a base unit and a plurality of response units coupled with said base unit through a communication link, each said response unit including a microphone and a user input device wherein a user enters a call request for an audio connection with said host system using said user input device and said base unit establishes said audio connection between said microphone of one of said response units and said host system in response to a talk instruction from said host system;

said host system including a computer, an instructor selection device and a display, said computer generating at least one call list displayed on said display of individuals who have entered a call request and said selection device provides for the selection of at least one individual on said at least one call list, wherein said host system provides a talk instruction to the one of said response units associated with the selected individual in order to establish said audio connection between the one of said response units associated with the selected individual and the host system; and an echo suppression system which suppresses an audio signal from said host system when an audio signal from the one of said response units associated with the selected individual is present and suppresses said audio signal from the one of said response units associated with the selected individual when said audio signal from the host system is present, said echo suppression system including a manual override for the instructor to suppress said audio signal from the one of said response units associated with the selected individual.

27. The interactive response system in claim 26 wherein said instructor selection device provides for the selection of a plurality of individuals on said at least one call list and wherein said host system provides a talk instruction to the one of said response units associated with each of the selected individuals, whereby the plurality of selected individuals are conferenced together.

28. An interactive response system for retrieving at a central location responses from a plurality of users located at at least one geographically separated site and providing interaction between an instructor at the central location and said users, comprising:

a central control host system including an instructor console adapted to producing instructions for establishing audio connections;

at least one wireless remote system geographically separated from said host system and including a base unit, a plurality of response units and a wireless communication link between said base unit and said response units, each of said response units including a user input selection device and a microphone; said wireless communication link including a data communication channel for communicating data signals between said base unit and said response units and an audio communication channel for communicating audio signals between said base unit and said microphone of each of said response units; and a data link and an audio link between said host system and said base unit;

wherein said base unit selectively communicates over said data communication channel to said response units an instruction for activating the microphone of one of said response units and said one of said response units responds to said instruction for activating the microphone of that response unit by opening said audio communication channel between the microphone of that response unit and said base station, and wherein each of said response units communicates over said data communication channel to said base unit any user input selection entered with said user input selection device of a request for an audio connection with said host system;

wherein said base unit communicates over said data link to said host system any requests for said audio connection with said host system, said host system communicates over said data link to said base unit an instruction for establishing an audio connection between said host system and any response unit and said base unit responds to said instruction for establishing said audio connection by activating the microphone of one of said response units and by opening said audio connection between said audio communication channel and said host system over said audio link.

29. The interactive response system in claim 28 wherein said base unit communicates an instruction for activating the microphone of one of said response units by sending a base data packet including a selectable data bit specific to that response unit.

30. The interactive response system in claim 29 wherein each of said response units communicates a response data packet in response to a base data packet, said response data packet including any request for said audio connection with said host system.

31. The interactive response system in claim 30 wherein said response data packet includes user responses entered with said user input selection device to inquiries originating from said host system.

32. The interactive response system in claim 30 wherein said response data packet includes user identification entered with said user input selection device.

33. The interactive response system in claim 29 wherein said base data packet includes an acknowledge character indicative of whether a valid response was previously received from a particular response unit.

34. The interactive response system in claim 29 wherein said base data packet includes a correctness character indicative of whether a previously received response matches a correct answer in an answer key.

35. The interactive response system in claim 34 wherein each response unit displays the value of the correctness character pertaining to that particular response unit.

36. The interactive response system in claim 29 wherein said remote response units are divided into groups and wherein said base data packet includes a designation of a particular group of response units to respond to the base data packet by communicating a response data packet.

37. The interactive response system in claim 28 including a combination audio and video feed from said host system to said base unit and a monitor at said geographically separated site for displaying audio and video information provided by the instructor.

38. The interactive response system in claim 28 wherein said audio link is a POTS service.

39. The interactive response system in claim 28 wherein said data link is selected from a group consisting of a wide area network, a local area network, a packet network, an Internet network, and an asynchronous transfer mode network.

40. The interactive response system in claim 28 wherein said audio and data links are combined in a digital simultaneous voice and data transmission over a POTS line.

41. The interactive response system in claim 28 wherein said audio and data links are combined in an ISDN transmission.

42. The interactive response system in claim 28 wherein said display console is further adapted to display information identifying individuals requesting audio connection with said host system.

43. The interactive response system in claim 42 wherein said information identifying individuals is derived from a roster of individuals each identified by name and an identifying number and from identifying numbers entered by users in said response units.

44. The interactive response system in claim 30 wherein each of said response units must continue to communicate a response data packet including any request for an audio connection with said host system in response to each base data packet until said base unit communicates to that response unit an instruction for activating the microphone of that response unit.

45. The interactive response system in claim 44 wherein said host system monitors the length of time since initiation of each request for an audio connection with the host system and takes action after the length of time since initiation of a request exceeds a particular value.

46. The interactive response system in claim 45 wherein said action includes one of providing an indication to the instructor and terminating the request for an audio connection.

47. The interactive response system in claim 46 wherein said action includes providing an indication to the instructor after a first particular value of length of time since initiation of a request and terminating the request for an audio link after a second particular value of length of time since initiation of a request, wherein said second particular value is greater than said first particular value.

48. An interactive response system for retrieving at a central location responses from a plurality of users located at at least one geographically separated site and providing interaction between an instructor at the central location and said users, comprising:

a central control host system;

at least one remote system geographically separated from said host system and including a base unit, a plurality of response units and a communication link between said base unit and said response units, each of said response units including a user input selection device and a microphone; said communication link for communicating data signals between said base unit and said response units and for communicating audio signals between said base unit and said microphone of each of said response units;

a data link and an audio link between said host system and said base unit;

wherein each of said response units communicates to said base unit any user input selection entered with said user input selection device of a request for an audio connection with said host system and wherein said base unit communicates over said data link to said host system any requests for said audio connection with said host system, said host system communicates over said data link to said base unit an instruction for establishing said audio connection between said host system and any response unit and said base unit responds to said instruction for establishing said audio connection by activating the microphone of one of said response units and by opening said audio connection between said audio communication channel and said host system over said audio link;

wherein said host system includes a display which displays at least one call list to said instructor and a computer which receives said instructor's selection of a characteristic of individuals for inclusion on said at least one call list, defines a roster of individual files and at least one characteristic of each individual in that individual's file and retrieves from said roster and display on said at least one call list only individuals requesting said audio connection with said host system who have the selected characteristic in their roster file.

49. The interactive response system in claim 48 wherein said computer receives said instructor's selection of at least one individual displayed on said at least one call list and communicates over said data link to said base unit said instruction for establishing said audio connection between said host system and said at least one individual.

50. The interactive response system in claim 49 wherein said computer receives an instructor's selection of a plurality of individuals displayed on said at least one call list and said computer communicates instructions for establishing said audio connection between said host system and said plurality of individuals, whereby said plurality of individuals are conferenced together.

51. The interactive response system in claim 48 wherein said display includes at least one status indicator which indicates to said instructor if the number of individuals listed on said at least one call list exceeds a predetermined level.

52. The interactive response system in claim 51 wherein said status indicator produces a first indication to said instructor if individuals listed on said at least one call list are fewer than a first level, a second indication to said instructor if individuals listed on said at least one call list are more than said first level and fewer than a second level and a third indication to said instructor if the individuals listed on said at least one call list are more than said second level, said second level being greater than said first level.

53. The interactive response system in claim 52 wherein said first indication is green colored, said second indication is yellow colored and said third indication is red colored.

54. The interactive response system in claim 52 wherein each of said first, second and third levels is selectable by an instructor.

55. The interactive response system in claim 48 wherein said at least one call list comprises a plurality of call lists, said computer receives said instructor's selection of said characteristic of individuals for inclusion on each of said call lists and retrieves from said roster and displays on each of said call lists only individuals requesting said audio connection with said host system who have the selected characteristic for that call list in their roster file.

56. An interactive response system for retrieving at a central location responses from a plurality of users located at at least one geographically separated site and providing interaction between an instructor at the central location and said users, comprising:

a plurality of response units, each response unit having a microphone, a response input, a display, a controller and at least a first wireless transceiver;

a base unit having a controller, at least a second wireless transceiver and a telephone interface port; and an instructor unit located geographically distant from said base unit;

wherein said at least a first transceiver transfers responses entered by a user with said response input and an audio signal from said microphone wirelessly to said at least a second wireless transceiver and said telephone interface port transfers said audio signal to an instructor at said instructor unit over a telephone link.

57. The interactive response system in claim 56 wherein said at least a first wireless transceiver further includes a third wireless transceiver and said at least a second wireless transceiver further includes a fourth wireless transceiver and wherein said responses entered by a user with said response input are transferred by said first wireless transceiver to said second wireless transceiver and said audio signal from said microphone is transferred from said third wireless transceiver to said fourth wireless transceiver.

58. The interactive response system in claim 57 wherein said first and second wireless transceivers comprise an RF link.

59. The interactive response system in claim 57 wherein said third and fourth wireless transceivers comprise an RF link.

60. The interactive response system in claim 56 wherein said microphone is active to produce said audio signal only in response to a command from an instructor at said instructor's unit.

* * * * *

UNITED STATES PATENT AND TRADEMARK OFFICE
CERTIFICATE OF CORRECTION

PATENT NO.    : 6,021,119
DATED         : February 1, 2000
INVENTOR(S)   : Harry G. Derks, Nicholas W. Medendorp;
                Michael J. Mc Kanna; Hugh D. Harper,
                William S. Buehler, Patrick L. Moody and
                Thomas H. Morell It is certified that error appears in the above-identified patent and that said Letters Patent is hereby corrected as shown below:

Cover page, [75] Inventors:
"Medendrop" should be --Medendorp--.

Cover page, [75] Inventors:
"Zelland" should be --Zeeland--.

Signed and Sealed this

Third Day of April, 2001

Attest:

NICHOLAS P. GODICI

*Attesting Officer*    Acting Director of the United States Patent and Trademark Office